US012548500B2

(12) United States Patent
Kim et al.

(10) Patent No.: US 12,548,500 B2
(45) Date of Patent: Feb. 10, 2026

(54) DISPLAY DEVICE HAVING POWER CONNECTION LINES BETWEEN FIRST AND SECOND DATA CONNECTION LINE GROUPS AND ELECTRONIC DEVICE INCLUDING THE SAME

(71) Applicant: Samsung Display Co., Ltd., Yongin-Si (KR)

(72) Inventors: Tae-Ho Kim, Yongin-si (KR); Jaewoo Lee, Yongin-si (KR); Seung-Jun Lee, Yongin-si (KR); Sang Min Jeon, Yongin-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 0 days.

(21) Appl. No.: 19/008,629

(22) Filed: Jan. 3, 2025

(65) Prior Publication Data

US 2025/0225922 A1 Jul. 10, 2025

(30) Foreign Application Priority Data

Jan. 5, 2024 (KR) ........................ 10-2024-0002427

(51) Int. Cl.
*G09G 3/30* (2006.01)
*G09G 3/32* (2016.01)
(Continued)

(52) U.S. Cl.
CPC ............. *G09G 3/32* (2013.01); *G09G 3/3275* (2013.01); *G09G 2300/0426* (2013.01); *G09G 2310/0275* (2013.01)

(58) Field of Classification Search
CPC ......... G09G 3/3275; G09G 2300/0426; G09G 2310/0275; H10K 59/131; H10K 77/111
See application file for complete search history.

(56) References Cited

U.S. PATENT DOCUMENTS 11,107,416 B2 8/2021 Cho et al.
11,706,955 B2 7/2023 Jung et al.
(Continued)

FOREIGN PATENT DOCUMENTS

KR 10-2021-0027641 A 3/2021
KR 10-2022-0091637 A 7/2022
(Continued)

*Primary Examiner* — Sanghyuk Park
(74) *Attorney, Agent, or Firm* — Innovation Counsel LLP

(57) ABSTRACT

A display device according to an embodiment may include a substrate including a display area, a first peripheral area, a second peripheral area, and a bending area between the first peripheral area and the second peripheral area, a data distributor in the second peripheral area and spaced apart from the display area with the bending area interposed therebetween, a data driver in the second peripheral area, first data connection line groups including first data connection lines receiving a data signal in response to a first distribution selection signal, second data connection line groups including second data connection lines receiving the data signal in response to a second distribution selection signal, and power connection lines receiving a power supply voltage. Each of the power connection lines may be between the first data connection line groups and the second data connection line groups adjacent to each other.

18 Claims, 16 Drawing Sheets

(51) Int. Cl.
*G09G 3/3275* (2016.01)
*G09G 3/36* (2006.01)

(56) References Cited

U.S. PATENT DOCUMENTS

| | | | | |
|---|---|---|---|---|
| 2017/0288008 | A1* | 10/2017 | Kim | H10K 59/1315 |
| 2020/0357345 | A1* | 11/2020 | Cho | G09G 3/3233 |
| 2021/0201812 | A1* | 7/2021 | Ma | G09G 3/3275 |
| 2021/0234079 | A1* | 7/2021 | Han | G09F 9/30 |
| 2022/0199750 | A1 | 6/2022 | Cho et al. | |
| 2023/0112912 | A1* | 4/2023 | Qing | G09G 3/3208 345/204 |
| 2024/0169870 | A1 | 5/2024 | Lee et al. | |
| 2024/0233653 | A1 | 7/2024 | Lee et al. | |

FOREIGN PATENT DOCUMENTS

| | | | |
|---|---|---|---|
| KR | 10-2024-0110712 | A | 7/2024 |
| KR | 10-2024-0144695 | A | 10/2024 |

* cited by examiner

DISPLAY DEVICE HAVING POWER CONNECTION LINES BETWEEN FIRST AND SECOND DATA CONNECTION LINE GROUPS AND ELECTRONIC DEVICE INCLUDING THE SAME

CROSS-REFERENCE TO RELATED APPLICATION(S)

This application claims priority to Korean Patent Application No. 10-2024-0002427, filed on Jan. 5, 2024, and all the benefits accruing therefrom under 35 U.S.C. § 119, which is hereby incorporated by reference for all purposes as if fully set forth herein.

BACKGROUND

1. Field

Embodiments relate to a display device and an electronic device.

2. Description of the Related Art

As information technology develops, the importance of display devices providing a connection medium between users and information is being highlighted. For example, the use of display devices such as a liquid crystal display device (LCD), an organic light emitting display device (OLED), a plasma display device (PDP), and a quantum dot display device is increasing.

Display devices generally have a display area where pixels are located and a peripheral area surrounding the display area. Research to reduce the peripheral area is ongoing.

SUMMARY

Embodiments provide a display device with relatively reduced dead space and relatively improved reliability.

Embodiments also provide an electronic device including the display device.

Additional features of the inventive concepts will be set forth in the description which follows, and in part will be apparent from the description, or may be learned by practice of the inventive concepts.

A display device according to an embodiment may include a substrate, a data distributor, a data driver, first data connection line groups, second data connection line groups, and power connection lines. The substrate includes a display area, a first peripheral area surrounding the display area, a second peripheral area positioned in a first direction from the first peripheral area, and a bending area positioned between the first peripheral area and the second peripheral area. The data distributor is in the second peripheral area on the substrate and spaced apart from the display area with the bending area interposed therebetween. The data driver is in the second peripheral area on the substrate and positioned in the first direction from the data distributor. The first data connection line groups include first data connection lines electrically connected to the data distributor and configured to receive a data signal output from the data driver in response to a first distribution selection signal. The second data connection line groups include second data connection lines electrically connected to the data distributor and configured to receive the data signal output from the data driver in response to a second distribution selection signal. The power connection lines are configured to receive a first power supply voltage. Each of the power connection lines may be between one of the first data connection line groups and one of the second data connection line groups adjacent to each other.

In an embodiment, the display device may further include a first power pad line in the second peripheral area on the substrate and configured to receive the first power supply voltage from a first power pad and a first power line in the first peripheral area on the substrate. The power connection lines may be electrically connected to the first power pad line and the first power line.

In an embodiment, each of the power connection lines may include a first power connection line in the second peripheral area on the substrate and electrically connected to the first power pad line and a second power connection line in the bending area on the substrate and electrically connected to the first power connection line.

In an embodiment, the second peripheral area may include a groove area spaced apart from the bending area in the first direction. The first power connection line may overlap the groove area and may be electrically connected to the second power connection line through a second contact hole between the bending area and the groove area.

In an embodiment, the first power connection line may be disposed on a different layer from the first power pad line and the second power connection line, may be electrically connected to the first power pad line through a first contact hole, and may be electrically connected to the second power connection line through the second contact hole. The first contact hole may be positioned in the first direction from the groove area.

In an embodiment, the display device may further include an inorganic insulating layer covering the first power connection line and an organic insulating layer on the inorganic insulating layer, covering the first power pad line, and defining an opening overlapping the groove area.

In an embodiment, the display device may further include data bending lines in the bending area on the substrate and electrically connected to the first data connection lines and the second data connection lines.

In an embodiment, each of the first data connection lines and the second data connection lines may overlap the groove area and may be electrically connected to a corresponding one of the data bending lines through a contact hole between the bending area and the groove area.

In an embodiment, the second power connection line and the data bending lines may be disposed on a same layer.

In an embodiment, the second power connection line and the data bending line may be spaced apart from each other in a second direction crossing the first direction in a plan view.

In an embodiment, the display device may further include a second power pad line in the second peripheral area on the substrate, spaced apart from the first power pad line, and configured to receive a second power supply voltage from a second power pad, a second power line in the first peripheral area on the substrate, spaced apart from the first power line, and configured to receive the second power supply voltage, a second power bending line in the bending area on the substrate, spaced apart from the second power connection line and the data bending lines, and electrically connected to the second power pad line and the second power line.

In an embodiment, the display device may further include data lines connected to pixels in the display area and each extending in the first direction and data fan-out lines in the first peripheral area on the substrate and connecting the data lines and the data bending lines, respectively. The data fan-out lines may include a first data fan-out line adjacent to the second power line and a second data fan-out line spaced apart from the second power line with the first data fan-out line interposed therebetween. A length of the first data fan-out line may be greater than a length of the second data fan-out line.

In an embodiment, an imaginary line extending in the first direction may be defined. An angle between the imaginary line and the first data fan-out line may be greater than an angle between the imaginary line and the second data fan-out line.

In an embodiment, the first power connection line, the first data connection lines, and the second data connection lines may be disposed on a same layer.

In an embodiment, each of the power connection lines may further include a third power connection line in the first peripheral area on the substrate and electrically connected to the second power connection line and the first power line.

In an embodiment, the display device may further include a first power bending line in the bending area on the substrate and connecting the first power pad line and the first power line. A width of the first power bending line may be greater than a width of the second power connection line.

In an embodiment, the second power connection line and the first power bending line may be disposed on a same layer.

In an embodiment, the first data connection lines and the second data connection lines may overlap the first power pad line in a plan view.

In an embodiment, the first data connection lines, the second data connection lines, and the power connection lines may be spaced apart from each other in a second direction crossing the first direction.

In an embodiment, the data distributor may include first distribution transistors each including a first electrode to which the data signal is applied, a second electrode connected to the first data connection line, and a gate electrode configured to receive the first distribution selection signal and second distribution transistors each including a first electrode to which the data signal is applied, a second electrode connected to the second data connection lines, and a gate electrode configured to receive the second distribution selection signal.

An electronic device according to an embodiment includes a display device and a power supply configured to provide power to the display device. The display device includes a substrate, a data distributor, a data driver, first data connection line groups, second data connection line groups, and power connection lines. The substrate includes a display area, a first peripheral area surrounding the display area, a second peripheral area positioned in a first direction from the first peripheral area, and a bending area positioned between the first peripheral area and the second peripheral area. The data distributor is in the second peripheral area on the substrate and spaced apart from the display area with the bending area interposed therebetween. The data driver is in the second peripheral area on the substrate and positioned in the first direction from the data distributor. The first data connection line groups include first data connection lines electrically connected to the data distributor and configured to receive a data signal output from the data driver in response to a first distribution selection signal. The second data connection line groups include second data connection lines electrically connected to the data distributor and configured to receive the data signal output from the data driver in response to a second distribution selection signal. The power connection lines are configured to receive a first power supply voltage. Each of the power connection lines may be between one of the first data connection line groups and one of the second data connection line groups adjacent to each other.

According to embodiments, the dead space of the display device may be relatively reduced, and the reliability of the display device may be relatively improved.

It is to be understood that both the foregoing general description and the following detailed description are exemplary and explanatory and are intended to provide further explanation of the inventive concept as claimed.

BRIEF DESCRIPTION OF THE DRAWINGS

The accompanying drawings, which are included to provide a further understanding of the inventive concept and are incorporated in and constitute a part of this specification, illustrate embodiments, and together with the description serve to explain the inventive concept.

DETAILED DESCRIPTION

Figure 1:
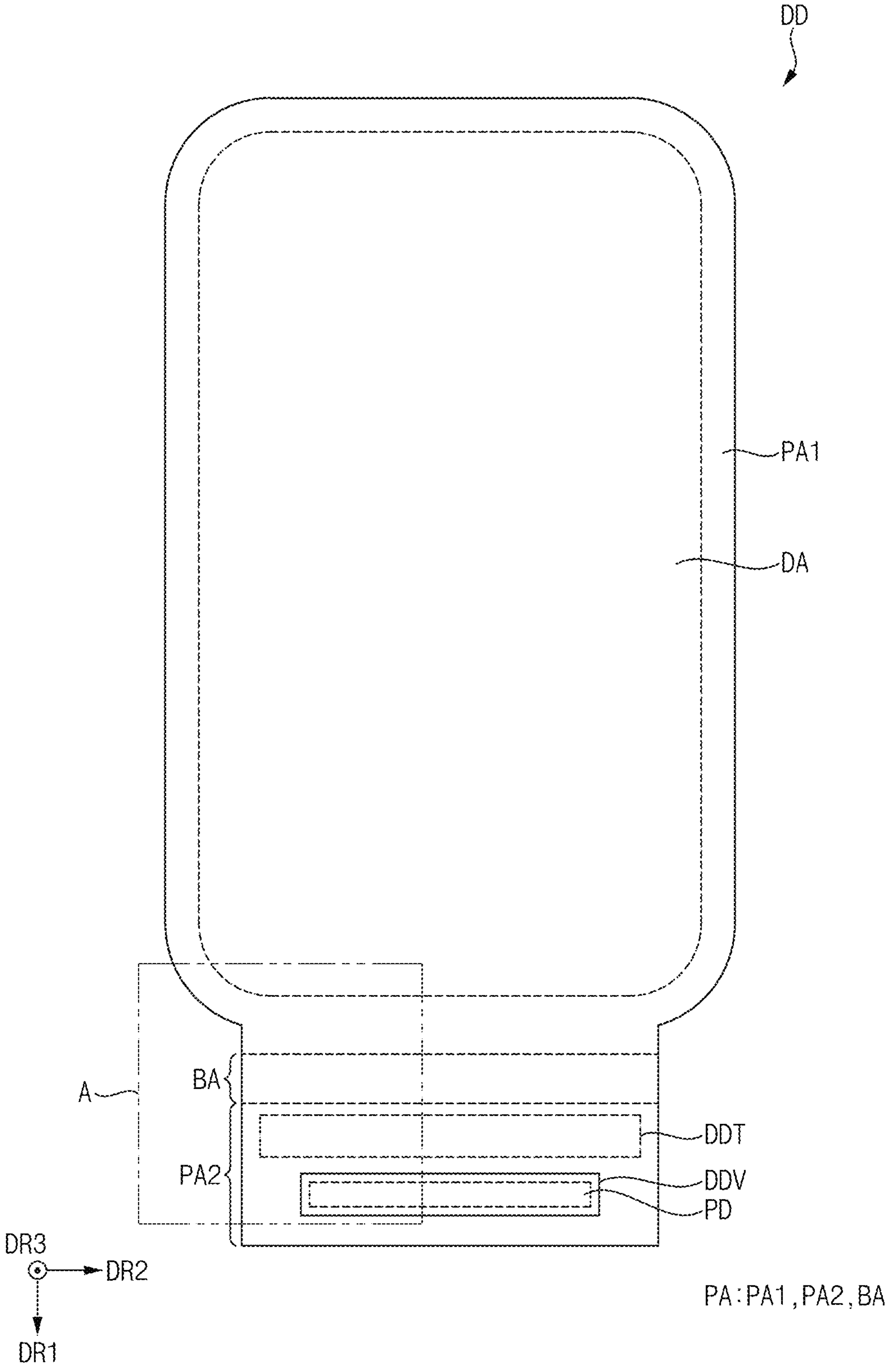
FIG. 1 is a plan view illustrating a display device according to an embodiment.

The inventive concept now will be described more fully hereinafter with reference to the accompanying drawings, in which various embodiments are shown. The inventive concept may, however, be embodied in many different forms, and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout.

It will be understood that when an element is referred to as being related to another element such as being "on"

another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, a reference number may indicate a singular element or a plurality of the element. For example, a reference number labeling a singular form of an element within the drawing figures may be used to reference a plurality of the singular element within the text of specification.

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Illustrative, non-limiting embodiments will be more clearly understood from the following detailed description in conjunction with the accompanying drawings.

FIG. 1 is a plan view illustrating a display device DD according to an embodiment.

Referring to FIG. 1, the display device DD according to an embodiment may have a display surface defined by a first direction DR1 and a second direction DR2 crossing the first direction DR1. The display device DD may display an image in a third direction DR3 through the display surface. The third direction DR3 may be substantially parallel to a normal direction of the display surface. The display surface may correspond to an upper surface (or a front surface) of the display device DD.

The display device DD (or a substrate SUB of FIG. 4) may have a display area DA and a peripheral area PA. The display area DA may display the image. For example, the display area DA may have a rectangular shape in a plan view, and a corner of the display area DA may be a rounded curve shape, but embodiments are not limited thereto.

The peripheral area PA may be positioned around the display area DA. In an embodiment, the peripheral area PA may include a first peripheral area PA1, a second peripheral area PA2, and a bending area BA. The first peripheral area PA1 may surround an outer edge of the display area DA. The second peripheral area PA2 may be positioned in the first direction DR1 from the display area DA and the first peripheral area PA1. The bending area BA may be positioned between the first peripheral area PA1 and the second peripheral area PA2. The bending area BA may be a portion or area where the display device DD is folded. The second peripheral area PA2 may be spaced apart from the first peripheral area PA1 in the first direction DR1 with the bending area BA interposed therebetween.

A data distributor DDT and a pad part PD may be disposed in the second peripheral area PA2. The data distributor DDT may be positioned in the first direction DR1 from the bending area BA. The data distributor DDT may be spaced apart from the display area DA in the first direction DR1 with the bending area BA interposed therebetween. That is, in the plan view of FIG. 1, the data distributor DDT may be positioned below the bending area BA.

The pad part PD may be positioned in the first direction DR1 from the data distributor DDT. A data driver DDV may be connected to the pad part PD. That is, the data driver DDV may be positioned in the first direction DR1 from the data distributor DDT.

Because the data distributor DDT is disposed in the second peripheral area PA2, when the bending area BA is folded, the data distributor DDT may overlap the first peripheral area PA1 or the display area DA in a plan view. Accordingly, an area of the first peripheral area PA1 may be reduced compared to a case where the data distributor DDT is disposed in the first peripheral area PA1. Thus, a dead space of the display device DD may be relatively reduced.

Figure 2:
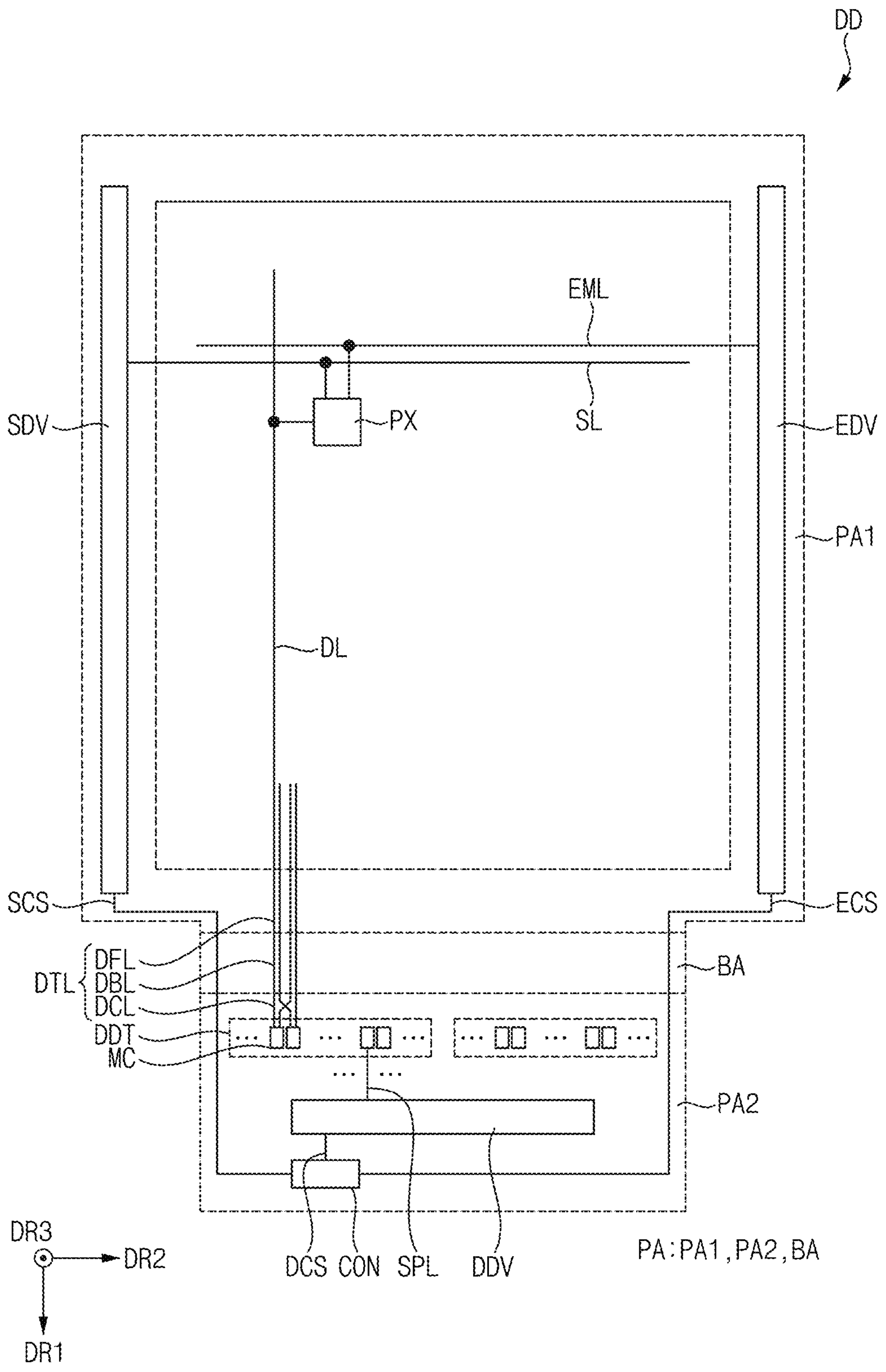
FIG. 2 is a block diagram illustrating a pixel and a driver included in the display device of FIG. 1.

FIG. 2 is a block diagram illustrating a pixel and a driver included in the display device DD of FIG. 1.

Referring to FIGS. 1 and 2, the display device DD may include a plurality of pixels PX, a driver, and a plurality of lines. The driver may include a scan driver SDV, an emission driver EDV, the data driver DDV, and a controller CON. Positions of the scan driver SDV, the emission driver EDV, the data driver DDV, and the controller CON illustrated in FIG. 2 are only an example and may be variously changed.

The lines may provide signals provided from the driver to the pixels PX. The lines may include a scan line SL, a data line DL, an emission control line EML, a power line (e.g., a first power line PL1 and a second power line PL2 of FIG. 6) and the like.

The pixels PX may be disposed in the display area DA. The pixels PX may be repeatedly arranged along the first direction DR1 and the second direction DR2.

The pixels PX may receive a scan signal through the scan line SL. In addition, the pixels PX may receive a data signal through the data line DL. The data signal may be written in the pixels PX in response to the scan signal. In addition, the pixels PX may receive an emission signal through the emission control line EML.

The data driver DDV may generate the data signal based on a data control signal DCS. The data control signal DCS may include an output data enable signal, a horizontal start signal, and a load signal.

The scan driver SDV may generate the scan signal based on a scan control signal SCS. For example, the scan signal may include a gate-on voltage for turning on a transistor and a gate-off voltage for turning off the transistor. The scan control signal SCS may include a vertical start signal and a clock signal.

The emission driver EDV may generate the emission signal based on an emission control signal ECS. A luminance of the display device DD may be adjusted based on the emission signal.

The controller CON (e.g., a timing controller) may receive an input image data and a control signal from an external host processor (e.g., a graphics processing unit). For example, an input image data may be RGB data including red image data, green image data, and blue image data. The control signal may include a vertical synchronization signal, a horizontal synchronization signal, an input data enable signal, a master clock signal, or the like. The controller CON may generate the scan control signal SCS, the data control signal DCS, and the emission control signal ECS based on the input image data and the control signal.

The data driver DDV may be connected to the data distributor DDT through spider lines SPL. In addition, as illustrated in FIG. 2, the data lines DL may be connected to the data distributor DDT through data transfer lines DTL. Each of the data transfer lines DTL may include a data connection line DCL, a data bending line DBL, and a data fan-out line DFL. The data connection line DCL may be disposed in the second peripheral area PA2 and may be connected to the data distributor DDT. The data fan-out line DFL may be disposed in the first peripheral area PA1 and may be connected to corresponding one of the data lines DL. The data bending line DBL may be disposed in the bending area BA and may connect the data connection line DCL and the data fan-out line DFL. The data transfer lines DTL will be described in more detail later with reference to FIGS. 6 and 7.

The data distributor DDT may include a plurality of mux circuits MC. The mux circuits MC may be arranged along the second direction DR2. The mux circuits MC will be described in more detail later with reference to FIG. 5. In addition, FIG. 2 illustrates that two data distributors DDT are disposed in the second peripheral area PA2 to be spaced apart from each other in the second direction DR2, but embodiments are not limited thereto. For example, only one data distributor DDT may be disposed in the second peripheral area PA2, or three or more data distributors DDT may be disposed to be spaced apart from each other in the second direction DR2.

Figure 3:
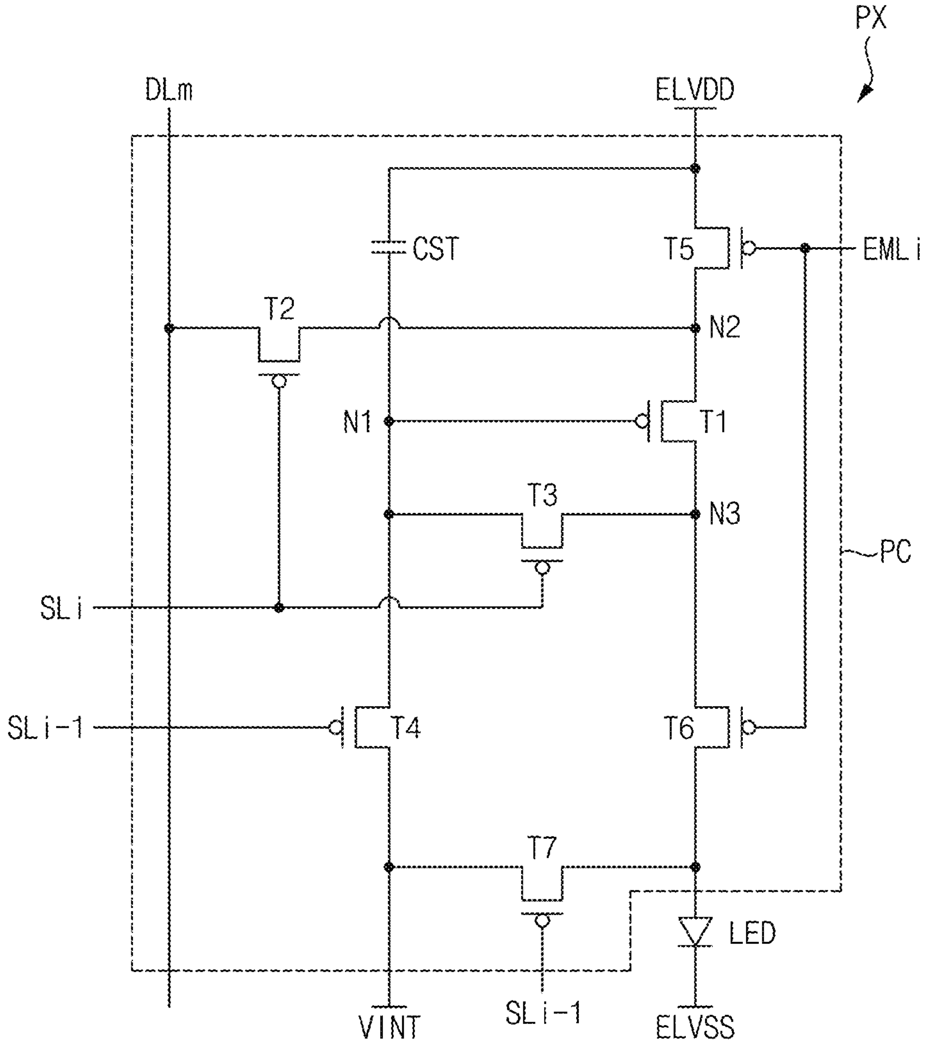
FIG. 3 is a circuit diagram illustrating the pixel included in the display device of FIG. 2.

FIG. 3 is a circuit diagram illustrating the pixel PX included in the display device DD of FIG. 2.

Each of the pixels PX may include a pixel circuit PC and a light emitting element LED. The pixel circuits PC may have substantially the same structure. Hereinafter, a pixel PX connected to a m-th data line DLm and a i-th scan line SLi will be described.

Referring to FIG. 3, the pixel circuit PC may include first to seventh pixel transistors T1, T2, T3, T4, T5, T6, and T7, and a storage capacitor CST.

The first pixel transistor T1 may include a gate electrode connected to a first node N1, a first electrode connected to a second node N2, and a second electrode connected to a third node N3.

The second pixel transistor T2 may include a gate electrode connected to the i-th scan line SLi, a first electrode connected to the m-th data line DLm, and a second electrode connected to the second node N2.

The third pixel transistor T3 may include a gate electrode connected to the i-th scan line SLi, a first electrode connected to the first node N1, and a second electrode connected to the third node N3.

The fourth pixel transistor T4 may include a gate electrode connected to a i−1th scan line SLi−1, a first electrode to which an initialization signal VINT is applied, and a second electrode connected to the first node N1.

The fifth pixel transistor T5 may include a gate electrode connected to a i-th emission control line EMLi, a first electrode to which a first power supply voltage ELVDD is applied, and a second electrode connected to the second node N2. The first power supply voltage ELVDD may be a high power supply voltage.

The sixth pixel transistor T6 may include a gate electrode connected to the i-th emission control line EMLi, a first electrode connected to the third node N3, and a second electrode connected to a first electrode (e.g., an anode) of the light emitting element LED.

The seventh pixel transistor T7 may include a gate electrode connected to the i−1th scan line SLi−1, a first electrode to which the initialization signal VINT is applied, and a second electrode connected to the first electrode of the light emitting element LED.

The storage capacitor CST may include a first electrode to which the first power supply voltage ELVDD is applied and a second electrode connected to the first node N1.

The light emitting element LED may include the first electrode and a second electrode (e.g., a cathode) to which a second power supply voltage ELVSS is applied. The second power supply voltage ELVSS may be a low power supply voltage. The light emitting element LED may emit light based on a driving current provided from the pixel circuit PC. For example, the light emitting element LED may include an organic light emitting diode, an inorganic light emitting diode, a quantum dot light emitting diode, a micro light emitting diode, or the like.

In FIG. 3, the first to seventh pixel transistors T1, T2, T3, T4, T5, T6, and T7 are illustrated as p-channel metal oxide semiconductor (PMOS) transistors, but embodiments are not limited thereto. For example, the third pixel transistor T3 and the fourth pixel transistor T4 may be n-channel metal oxide semiconductor (NMOS) transistors, and the other pixel transistors may be PMOS transistors. For another example, all of the first to seventh pixel transistors T1, T2, T3, T4, T5, T6, and T7 may be NMOS transistors.

In addition, the number of pixel transistors and the number of capacitors illustrated in FIG. 3 is only an example and may be variously changed according to embodiments.

Figure 4:
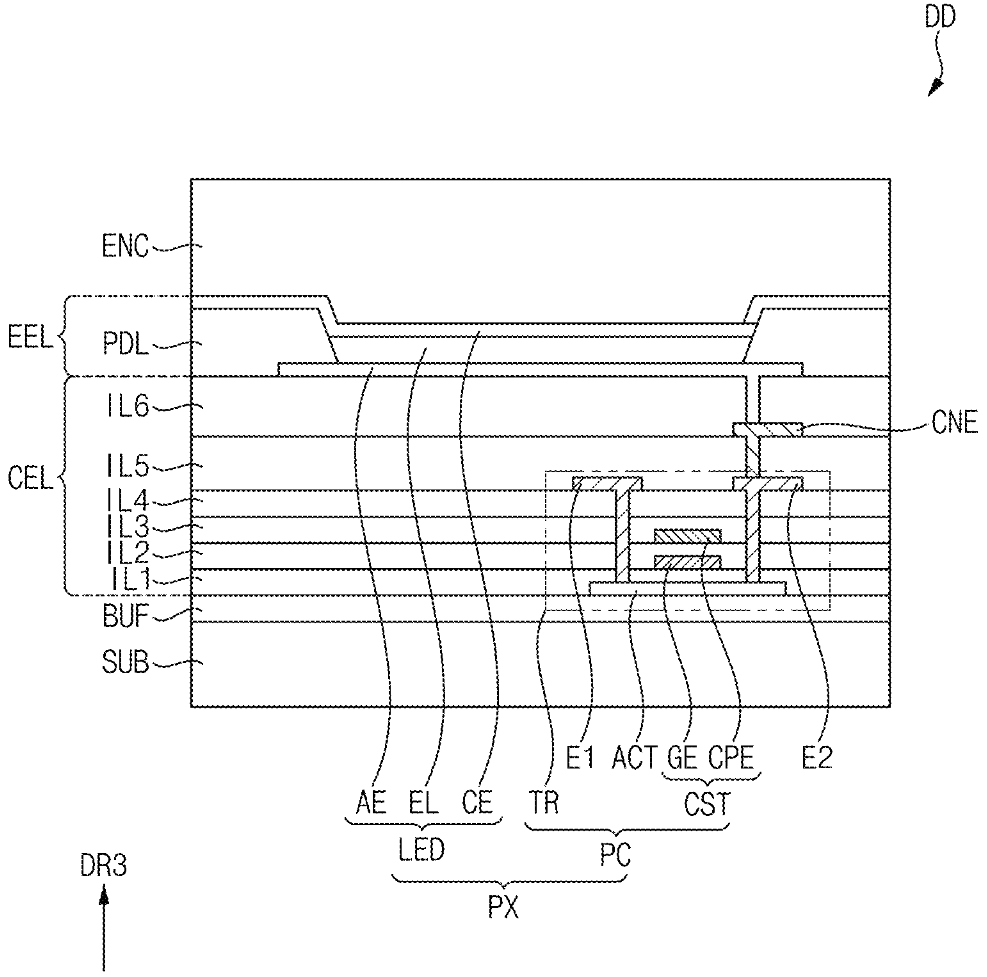
FIG. 4 is a cross-sectional view illustrating the pixel included in the display device of FIG. 2.

FIG. 4 is a cross-sectional view illustrating the pixel PX included in the display device DD of FIG. 2.

Referring to FIG. 4, the display device DD according to an embodiment may include a substrate SUB, a buffer layer BUF, a circuit element layer CEL, a light emitting element layer EEL, and an encapsulation layer ENC. The circuit element layer CEL may include a plurality of insulating layers IL1, IL2, IL3, IL4, IL5, and IL6 and the pixel circuit PC. The pixel circuit PC may include at least one pixel transistor TR and at least one storage capacitor CST. The light emitting element layer EEL may include a pixel defining layer PDL and the light emitting element LED. The light emitting element LED and the pixel circuit PC may form the pixel PX.

The substrate SUB may be an insulating substrate including or formed of a transparent material or a non-transparent material. In an embodiment, the substrate SUB may be a flexible substrate including plastic.

The buffer layer BUF may be disposed on the substrate SUB. The buffer layer BUF may prevent or reduce impurities such as oxygen or moisture from penetrating into an upper portion of the substrate SUB through the substrate SUB. The buffer layer BUF may include an inorganic material such as a silicon compound, metal oxide, or the like. In an embodiment, the buffer layer BUF may be omitted. The circuit element layer CEL may be disposed on the buffer layer BUF.

An active layer including an active pattern ACT may be disposed on the buffer layer BUF. The active layer may include an oxide semiconductor, a silicon semiconductor, an organic semiconductor, or the like. In an embodiment, for example, the oxide semiconductor may include at least one selected from oxides of indium (In), gallium (Ga), tin (Sn), zirconium (Zr), vanadium (V), hafnium (Hf), cadmium (Cd), germanium (Ge), chromium (Cr), titanium (Ti), and zinc (Zn). The silicon semiconductor may include an amorphous silicon, a polycrystalline silicon, or the like. The active pattern ACT may include a source area, a drain area, and a channel area positioned between the source area and the drain area.

The first insulating layer IL1 may be disposed on the active layer. The active layer may be disposed between the buffer layer BUF and the first insulating layer IL1. The first insulating layer IL1 may cover the active pattern ACT on the buffer layer BUF. The first insulating layer IL1 may include an inorganic insulating material.

A first conductive layer including a gate electrode GE may be disposed on the first insulating layer IL1. The first conductive layer may include a conductive material such as a metal, an alloy, a conductive metal nitride, a conductive metal oxide, a transparent conductive material, or the like. The gate electrode GE may overlap the channel area of the active pattern ACT.

The second insulating layer IL2 may be disposed on the first conductive layer. The first conductive layer may be disposed between the first insulating layer IL1 and the second insulating layer IL2. The second insulating layer IL2 may cover the gate electrode GE on the first insulating layer IL1. The second insulating layer IL2 may include an inorganic insulating material.

A second conductive layer including a capacitor electrode CPE may be disposed on the second insulating layer IL2. The second conductive layer may include a conductive material. The capacitor electrode CPE may overlap the gate electrode GE. The gate electrode GE, the second insulating layer IL2, and the capacitor electrode CPE may form the storage capacitor CST.

The third insulating layer IL3 may be disposed on the second conductive layer. The second conductive layer may be disposed between the second insulating layer IL2 and the third insulating layer IL3. The third insulating layer IL3 may cover the capacitor electrode CPE on the second insulating layer IL2. The third insulating layer IL3 may include an inorganic insulating material.

A third conductive layer may be disposed on the third insulating layer IL3. The fourth insulating layer IL4 may be disposed on the third conductive layer. The third conductive layer may be disposed between the third insulating layer IL3 and the fourth insulating layer IL4. The fourth insulating layer IL4 may include an inorganic insulating material. Hereinafter, each of the first to fourth insulating layers IL1, IL2, IL3, and IL4 may be referred to as an inorganic insulating layer.

A fourth conductive layer including a first electrode E1 and a second electrode E2 may be disposed on the fourth insulating layer IL4. The fourth conductive layer may include a conductive material. The first electrode E1 and the second electrode E2 may be connected to the source area and the drain area of the active pattern ACT through contact holes, respectively.

The fifth insulating layer IL5 may be disposed on the fourth conductive layer. The fourth conductive layer may be disposed between the fourth insulating layer IL4 and the fifth insulating layer IL5. The fifth insulating layer IL5 may include an organic insulating material.

A fifth conductive layer including a connection electrode CNE may be disposed on the fifth insulating layer IL5. The fifth conductive layer may include a conductive material. The connection electrode CNE may be connected to the second electrode E2 through a contact hole.

The sixth insulating layer IL6 may be disposed on the fifth conductive layer. The fifth conductive layer may be disposed between the fifth insulating layer IL5 and the sixth insulating layer IL6. For example, the sixth insulating layer IL6 may include an organic insulating material.

In the above description, the circuit element layer CEL has been described as including six insulating layers, one active layer, and five conductive layers, but this is an example and embodiments are not limited thereto. The number of each of insulating layers, active layer, and conductive layers included in the circuit element layer CEL may be variously changed.

The light emitting element layer EEL may be disposed on the circuit element layer CEL.

An anode electrode AE may be disposed on the sixth insulating layer IL6. The anode electrode AE may include a conductive material. The anode electrode AE may be connected to the connection electrode CNE through a contact hole. Accordingly, the anode electrode AE may be electrically connected to the pixel transistor TR.

The pixel defining layer PDL may be disposed on the anode electrode AE. The pixel defining layer PDL may cover a peripheral portion of the anode electrode AE, and may define a pixel opening extending to and exposing a central portion of the anode electrode AE. The pixel defining layer PDL may include an organic insulating material.

An emission layer EL may be disposed on the anode electrode AE. The emission layer EL may be disposed in the pixel opening of the pixel defining layer PDL. In some embodiments, the emission layer EL may include at least one of an organic light emitting material or quantum dot.

In an embodiment, the organic light emitting material may include a low molecular organic compound or a high molecular organic compound. Examples of the low molecular organic compound may include copper phthalocyanine, N,N'-diphenylbenzidine, tris-(8-hydroxyquinoline)aluminum, or the like. Examples of the high molecular organic compound may include poly(3,4-ethylenedioxythiophene), polyaniline, poly-phenylenevinylene, polyfluorene, or the like. These can be used alone or in a combination thereof.

In an embodiment, the quantum dot may include a core including a Group II-VI compound, a Group III-V compound, a Group IV-VI compound, a Group IV element, and/or a Group IV compound. In an embodiment, the quantum dot may have a core-shell structure including the core and a shell surrounding the core. The shell may serve as a protection layer for preventing the core from being chemically denatured to maintain semiconductor characteristics, and may serve as a charging layer for imparting electrophoretic characteristics to the quantum dot.

A cathode electrode CE may be disposed on the emission layer EL. The cathode electrode CE may also be disposed on the pixel defining layer PDL. The cathode electrode CE may include a conductive material. The anode electrode AE, the emission layer EL, and the cathode electrode CE may form the light emitting element LED.

The encapsulation layer ENC may be disposed on the cathode electrode CE. The encapsulation layer ENC may include at least one inorganic encapsulation layer and at least one organic encapsulation layer. In addition, although not illustrated in the drawing, various functional layers (e.g., a touch sensing layer, a color filter layer, a light collecting layer, or the like) may be disposed on the encapsulation layer ENC.

Figure 5:
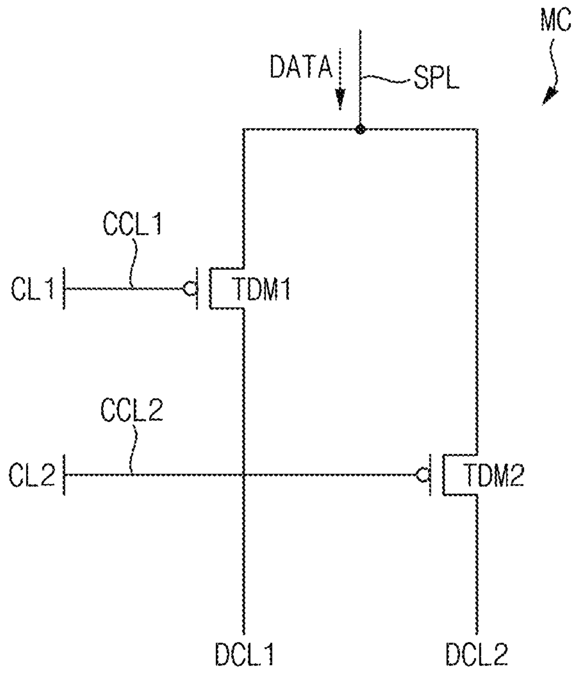
FIG. 5 is a circuit diagram illustrating a mux circuit included in the display device of FIG. 2.

FIG. 5 is a circuit diagram illustrating a mux circuit MC included in the display device of FIG. 2. In FIG. 5, a case where one spider line SPL is connected to one mux circuit MC and two data connection lines DCL are connected to one mux circuit MC will be described. For example, the data connection lines DCL may include a first data connection line DCL1 and a second data connection line DCL2, and the first data connection line DCL1 and the second data connection line DCL2 may be connected to one mux circuit MC. However, embodiments are not limited thereto.

Referring to FIG. 5, the mux circuit MC may include a first distribution transistor TDM1 and a second distribution transistor TDM2.

The first distribution transistor TDM1 may include a gate electrode connected to a first distribution selection signal line CCL1, a first electrode to which the data signal DATA is applied, and a second electrode connected to the first data connection line DCL1. A first distribution selection signal CL1 may be applied to the gate electrode of the first distribution transistor TDM1 through the first distribution selection signal line CCL1. When the first distribution selection signal CL1 is applied to the gate electrode of the first distribution transistor TDM1, the first distribution transistor TDM1 may be turned on and the data signal DATA may be output to the first data connection line DCL1. That is, the first distribution transistor TDM1 may output the data signal DATA to the first data connection line DCL1 in response to the first distribution selection signal CL1.

The second distribution transistor TDM2 may include a gate electrode connected to a second distribution selection signal line CCL2, a first electrode to which the data signal DATA is applied, and a second electrode connected to the second data connection line DCL2. A second distribution selection signal CL2 may be applied to the gate electrode of the second distribution transistor TDM2 through the second distribution selection signal line CCL2. When the second distribution selection signal CL2 is applied to the gate electrode of the second distribution transistor TDM2, the second distribution transistor TDM2 may be turned on and the data signal DATA may be output to the second data connection line DCL2. That is, the second distribution transistor TDM2 may output the data signal DATA to the second data connection line DCL2 in response to the second distribution selection signal CL2.

The first distribution transistor TDM1 and the second distribution transistor TDM2 may be selectively turned on by the first distribution selection signal CL1 and the second distribution selection signal CL2. Accordingly, the data signal DATA may be selectively provided to the two data connection lines.

Figure 6:
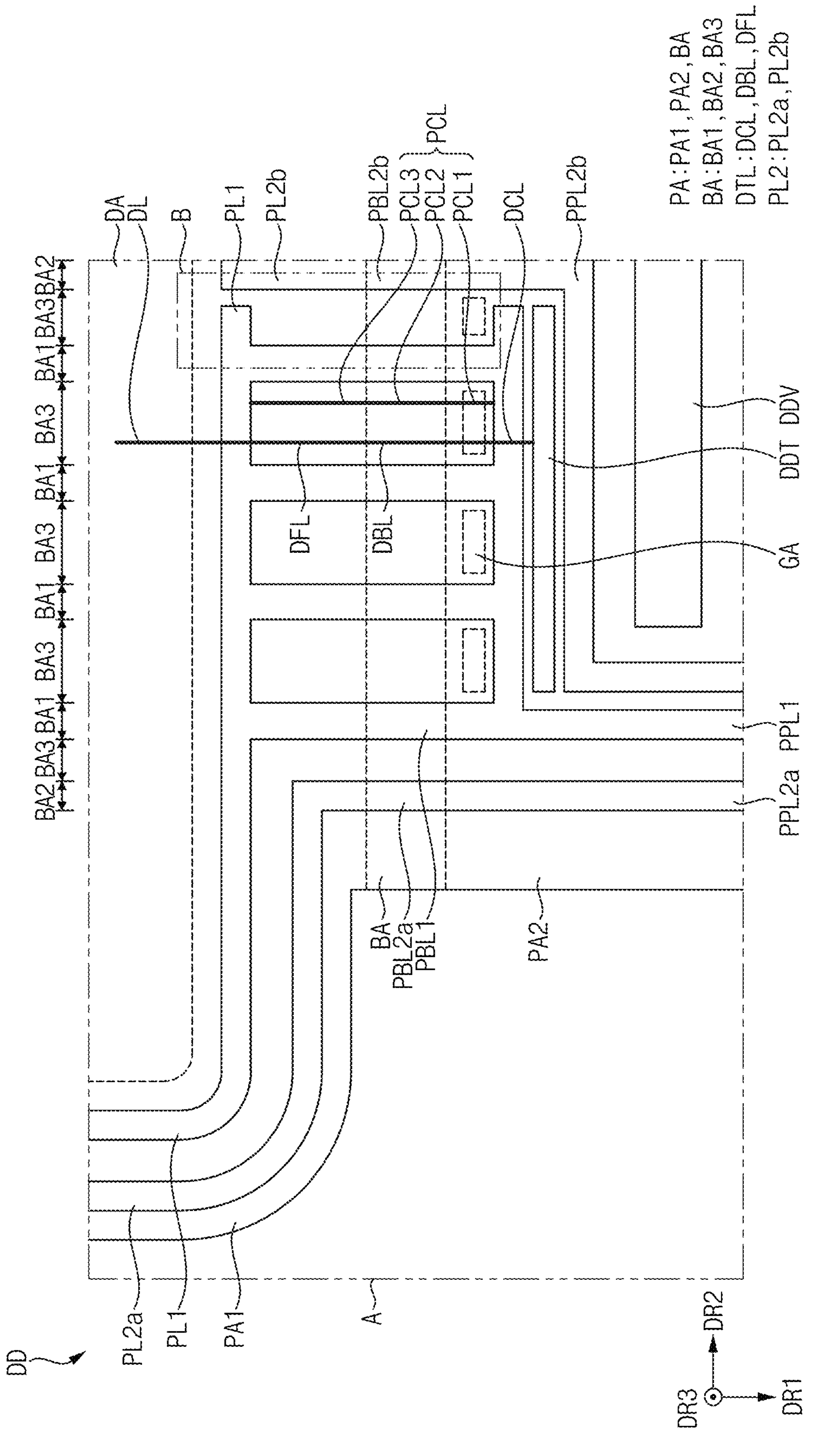
FIG. 6 is an enlarged view illustrating an example of an area A of FIG. 1.
Figure 7:
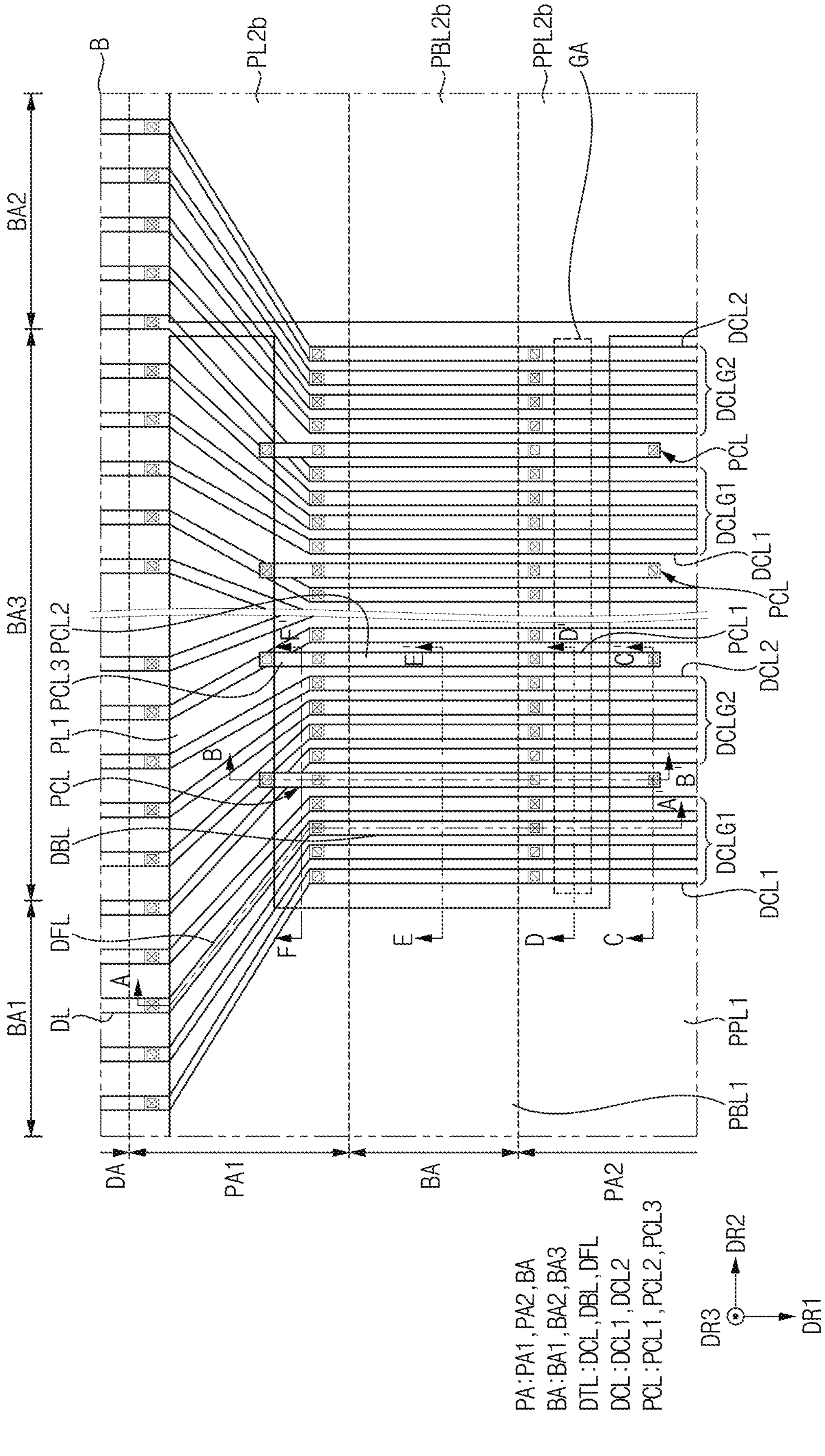
FIG. 7 is an enlarged view illustrating an example of an area B of FIG. 6.

FIG. 6 is an enlarged view illustrating an example of an area A of FIG. 1. FIG. 7 is an enlarged view illustrating an example of an area B of FIG. 6.

Referring to FIGS. 1, 6, and 7, a first power line PL1 receiving the first power supply voltage ELVDD and a second power line PL2 receiving the second power supply voltage ELVSS may be disposed in the first peripheral area PA1.

In an embodiment, the first power line PL1 may be disposed to surround the display area DA in a plan view. The first power supply voltage ELVDD may be transferred to the pixels PX through mesh-shaped first power transfer lines (not illustrated) connected to the first power line PL1.

The first power line PL1 may be connected to a first power pad line PPL1 disposed in the second peripheral area PA2 through a plurality of first power bending lines PBL1. The first power pad line PPL1 may receive the first power supply voltage ELVDD from a first power pad (not illustrated).

The first power bending lines PBL1 may be disposed in the bending area BA and may connect the first power line PL1 and the first power pad line PPL1. The first power bending lines PBL1 may each extend in the first direction DR1 and may be spaced apart from each other in the second direction DR2.

In an embodiment, the second power line PL2 may include a second-first power line PL2*a* disposed at a side portion of the display device DD and a second-second power line PL2*b* disposed at a central portion of the display device DD. The second-first power line PL2*a* may be disposed to surround the first power line PL1.

The second-first power line PL2*a* may be connected to a second-first power pad line PPL2*a* disposed in the second peripheral area PA2 through a second-first power bending line PBL2*a*. The second-second power line PL2*b* may be connected to a second-second power pad line PPL2*b* disposed in the second peripheral area PA2 through a second-second power bending line PBL2*b*. The second-first power pad line PPL2*a* and the second-second power pad line PPL2*b* may receive the second power supply voltage ELVSS from second power pads (not illustrated). The second-first power bending line PBL2*a* may be disposed in the bending area BA and may connect the second-first power line PL2*a* and the second-first power pad line PPL2*a*. The second-second power bending line PBL2*b* may be disposed in the bending area BA and may connect the second-second power line PL2*b* and the second-second power pad line PPL2*b*.

Each of the second-first power bending line PBL2*a* and the second-second power bending line PBL2*b* may extend in the first direction DR1. The second-first power bending line PBL2*a* may be spaced apart from the first power bending lines PBL1 in a direction opposite to the second direction DR2. The second-second power bending line PBL2*b* may be spaced apart from the first power bending lines PBL1 in the second direction DR2. That is, the first power bending lines PBL1 may be disposed between the second-first power bending line PBL2*a* and the second-second power bending line PBL2*b*.

In an embodiment, the bending area BA may include first bending areas BA1, second bending areas BA2, and third bending areas BA3 arranged along the second direction DR2. The first bending areas BA1 may be defined as areas where the first power bending lines PBL1 are disposed. The second bending areas BA2 may be defined as areas where the second-first power bending line PBL2*a* and the second-second power bending line PBL2*b* are disposed. The third bending areas BA3 may be defined as areas between two of the first power bending lines PBL1 adjacent to each other, between one of the first power bending lines PBL1 and the second-first power bending line PBL2*a* adjacent to each other, and between one of the first power bending lines PBL1 and the second-second power bending line PBL2*b* adjacent to each other. That is, the third bending areas BA3 may be defined as areas between two of the first bending areas BA1 adjacent to each other and between one of the first bending areas BA1 and one of the second bending areas BA2 adjacent to each other.

Figure 8:
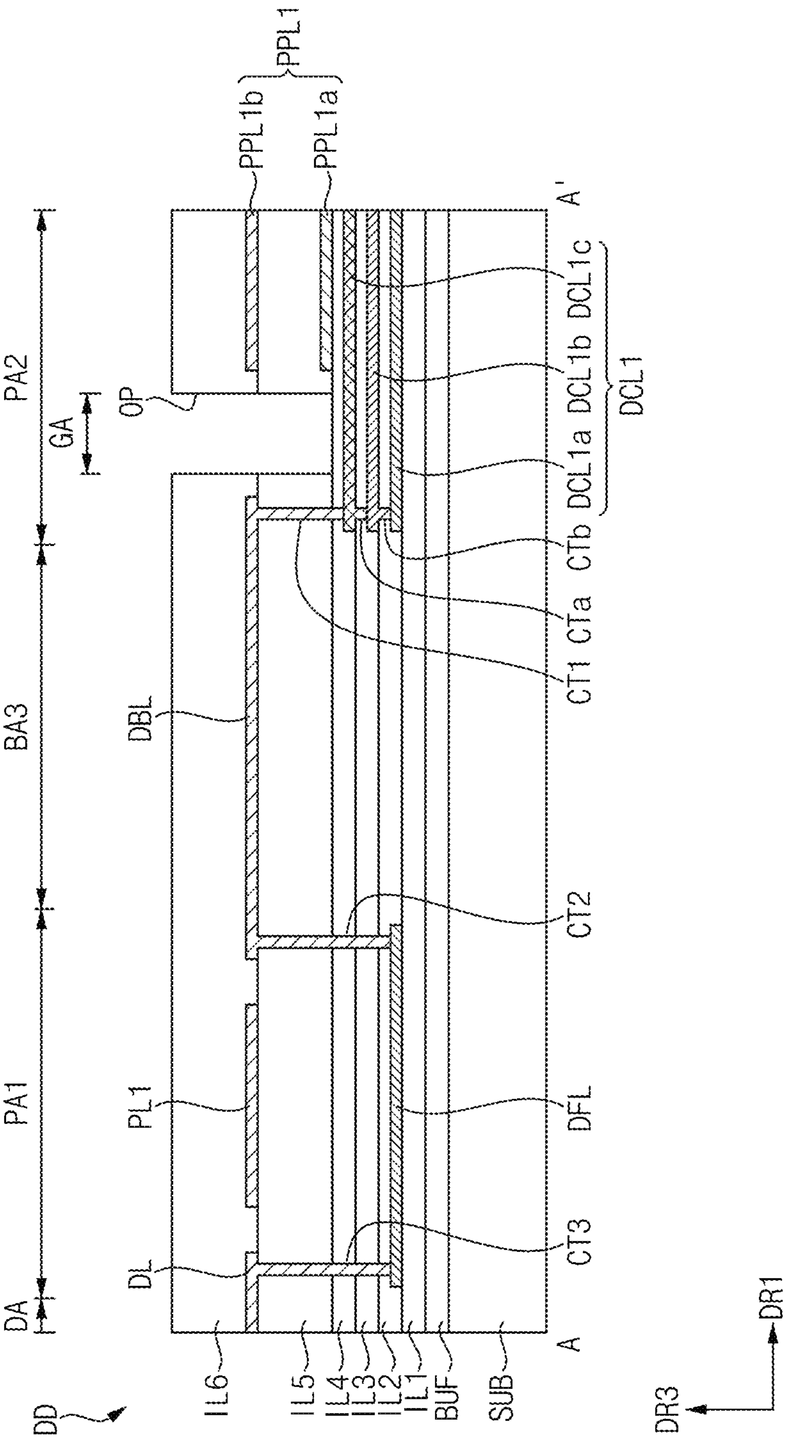
FIG. 8 is a cross-sectional view illustrating an example taken along line A-A' of FIG. 7.
Figure 9:
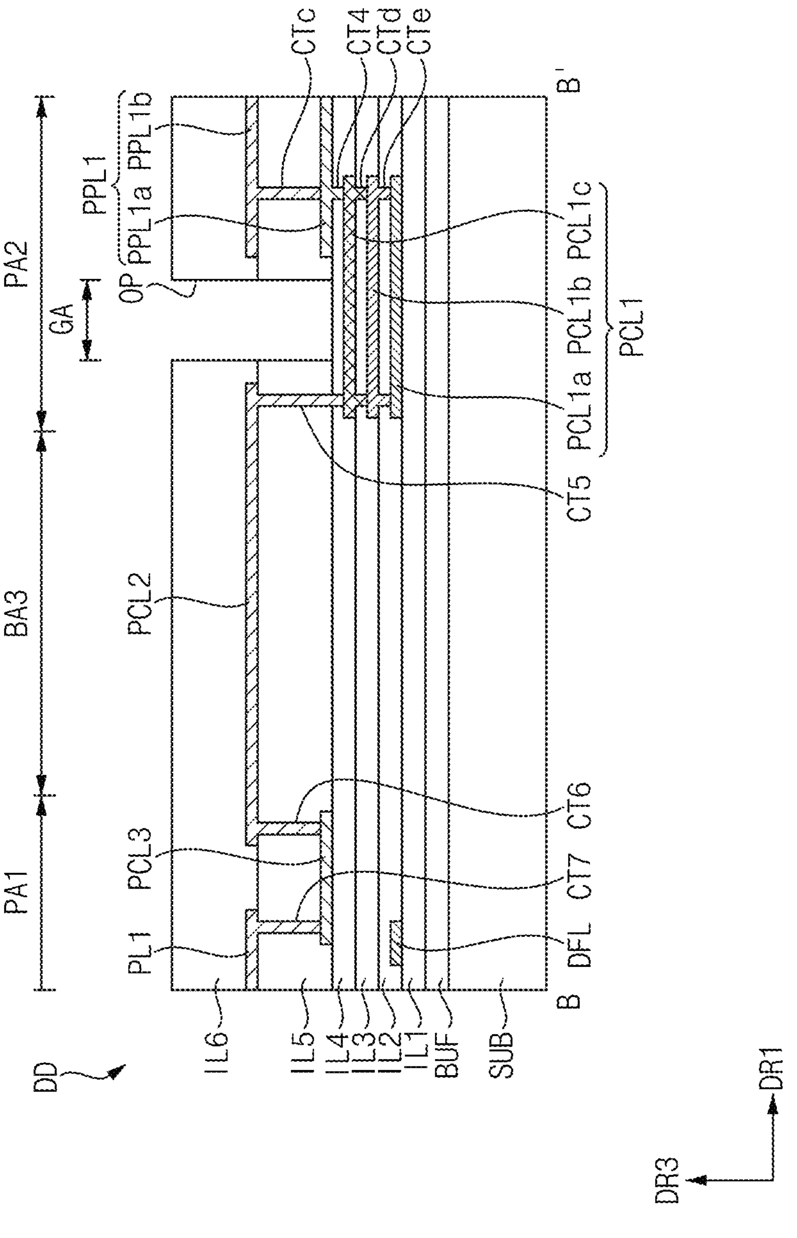
FIG. 9 is a cross-sectional view illustrating an example taken along line B-B' of FIG. 7.
Figure 11:
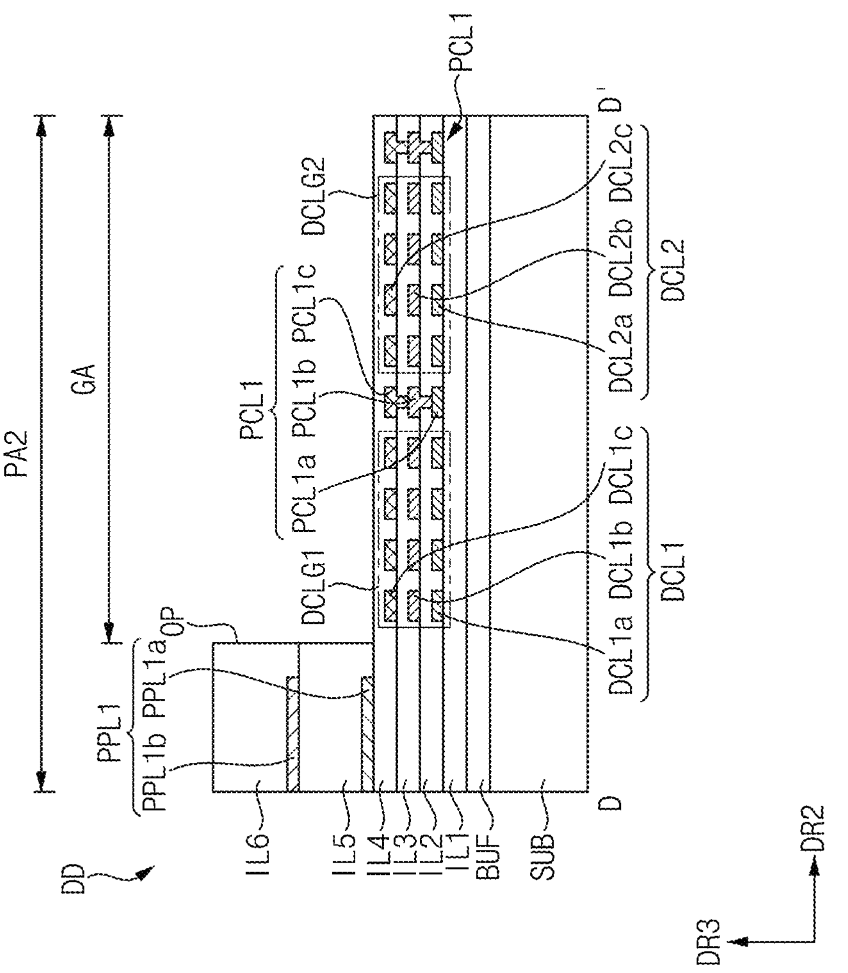
FIG. 11 is a cross-sectional view illustrating an example taken along line D-D' of FIG. 7.

In an embodiment, the second peripheral area PA2 may include a plurality of groove areas GA. As illustrated in FIGS. 8, 9, and 11, the groove area GA may be an area where organic insulating layers (e.g., the fifth and sixth insulating layers IL5 and IL6 of FIG. 4) are removed to prevent moisture penetration. That is, the groove area GA may be an area where only inorganic insulating layers (e.g., the first to fourth insulating layers IL1, IL2, IL3, and IL4) exist, excluding the organic insulating layers, among the insulating layers included in the circuit element layer CEL of FIG. 4. For example, openings OP that respectively overlap and define the groove areas GA may be defined in the organic insulating layers.

In an embodiment, each of the groove areas GA may be spaced apart from the bending area BA in the first direction DR1. Each of the groove areas GA may be spaced apart from the bending area BA, the first power pad line PPL1, the second-first power pad line PPL2*a*, and the second-second power pad line PPL2*b*. That is, in a plan view, each of the groove areas GA may not overlap the bending area BA, the first power pad line PPL1, the second-first power pad line PPL2*a*, and the second-second power pad line PPL2*b*. Each of the groove areas GA may be adjacent to a corresponding one of the third bending area BA3 in the first direction DR1.

As described above, the data lines DL disposed in the display area DA may be connected to the data distributor DDT through the data transfer lines DTL. Although only one data transfer line DTL is illustrated in FIG. 6 for convenience, as illustrated in FIG. 7, a plurality of data transfer lines DTL may be disposed to be spaced apart from each other in the second direction DR2.

Each of the data transfer lines DTL may include the data connection line DCL, the data bending line DBL, and the data fan-out line DFL. The data connection line DCL may be disposed in the second peripheral area PA2 and may be connected to the data distributor DDT. The data connection line DCL may overlap the first power pad line PPL1 in a plan view.

The data fan-out line DFL may be disposed in the first peripheral area PA1 and may be connected to corresponding one of the data lines DL. The data fan-out line DFL may overlap the first power line PL1, the second-first power line PL2*a*, or the second-second power line PL2*b* in a plan view.

The data bending line DBL may be disposed in the bending area BA and may connect the data connection line DCL and the data fan-out line DFL.

The data connection lines DCL may overlap adjacent groove area GA. Each of the data connection lines DCL may be connected to corresponding one of the data bending lines DBL through a contact hole between the groove area GA and the bending area BA. This will be described in more detail later with reference to FIG. 8.

The data connection lines DCL may include the first data connection lines DCL1 and the second data connection lines DCL2. Some of the data fan-out lines DFL and the data bending lines DBL may connect the data lines DL and the first data connection lines DCL1, and the others may connect the data lines DL and the second data connection lines DCL2.

As described with reference to FIG. 5, the first data connection lines DCL1 may receive the data signal DATA output from the data driver DDV in response to the first distribution selection signal CL1 applied to the mux circuit MC. In an embodiment, as illustrated in FIG. 7, four of the first data connection lines DCL1 may be adjacent to each other. The four of the first data connection lines DCL1 adjacent to each other may form a first data connection line group DCLG1. That is, one of the first data connection line groups DCLG1 may include four first data connection lines DCL1. However, embodiments are not limited thereto, and the number of the first data connection lines DCL1 included in the first data connection line group DCLG1 may be variously changed according to embodiments.

Accordingly, a plurality of the first data connection line groups DCLG1 may be formed, and the first data connection line groups DCLG1 may be arranged along the second direction DR2. In an embodiment, the number of the first data connection lines DCL1 included in each of the first data connection line groups DCLG1 may be equal to each other.

Likewise, as described with reference to FIG. 5, the second data connection lines DCL2 may receive the data signal DATA output from the data driver DDV in response to the second distribution selection signal CL2 applied to the mux circuit MC. In an embodiment, as illustrated in FIG. 7, four of the second data connection lines DCL2 may be adjacent to each other. The four of the second data connection lines DCL2 adjacent to each other may form a second data connection line group DCLG2. That is, one of the second data connection line groups DCLG2 may include four second data connection lines DCL2. However, embodiments are not limited thereto, and the number of the second data connection lines DCL2 included in the second data connection line group DCLG2 may be variously changed according to embodiments.

Accordingly, a plurality of the second data connection line groups DCLG2 may be formed, and the second data connection line groups DCLG2 may be arranged along the second direction DR2. In an embodiment, the number of the second data connection lines DCL2 included in each of the second data connection line groups DCLG2 may be equal to each other.

In an embodiment, the number of the first data connection lines DCL1 included in each of the first data connection line groups DCLG1 and the number of the second data connection lines DCL2 included in each of the second data connection line groups DCLG2 may be equal to each other.

In an embodiment, the first data connection line groups DCLG1 and the second data connection line groups DCLG2 may be alternately positioned along the second direction DR2. That is, one of the second data connection line groups DCLG2 may be positioned between two of the first data connection line groups DCLG1 adjacent to each other, and one of the first data connection line groups DCLG1 may be positioned between two of the second data connection line groups DCLG2 adjacent to each other.

Power connection lines PCL each extending in the first direction DR1 may be disposed between two of the first power bending lines PBL1 adjacent to each other. The power connection lines PCL may connect the first power pad line PPL1 and the first power line PL1. That is, the first power supply voltage ELVDD may be applied to the power connection lines PCL. Although only one power connection line PCL is illustrated in FIG. 6 for convenience, a plurality of power connection lines PCL may be disposed to be spaced apart from each other in the second direction DR2 between two of the first power bending lines PBL1 adjacent to each other. In addition, a plurality of power connection lines PCL may also be disposed between one of the first power bending lines PBL1 and the second-second power bending line PBL2*b* adjacent to each other.

In an embodiment, each of the power connection lines PCL may include a first power connection line PCL1, a second power connection line PCL2, and a third power connection line PCL3. The first power connection line PCL1 may be disposed in the second peripheral area PA2 and may be connected to the first power pad line PPL1. The third power connection line PCL3 may be disposed in the first peripheral area PA1 and may be connected to the first power line PL1. The second power connection line PCL2 may be disposed in the bending area BA and may connect the first power connection line PCL1 and the third power connection line PCL3.

The first power connection lines PCL1 may overlap the groove area GA. Each of the first power connection lines PCL1 may be connected to the corresponding second power connection line PCL2 through a contact hole between the groove area GA and the bending area BA. This will be described in more detail later with reference to FIG. 9.

In an embodiment, the power connection lines PCL may be positioned between the first data connection line group DCLG1 and the second data connection line group DCLG2 in a plan view. Accordingly, the power connection lines PCL may prevent or reduce coupling between the first data connection line group DCLG1 and the second data connection line group DCLG2 from occurring. That is, the power connection lines PCL may function as shielding lines, and a reliability of the display device DD may be improved.

In an embodiment, the number of the power connection lines PCL positioned between the first data connection line group DCLG1 and the second data connection line group DCLG2 adjacent to each other may be constant. For example, one power connection line PCL may be positioned between the first data connection line group DCLG1 and second data connection line group DCLG2 adjacent to each other. However, this is an example and embodiments are not limited thereto.

In an embodiment, the first data connection lines DCL1, the second data connection lines DCL2, and the power connection lines PCL may be arranged to be spaced apart from each other in the second direction DR2.

A width of each of the first data connection lines DCL1, the second data connection lines DCL2, and the power connection lines PCL in the second direction DR2 may be less than a width of the first power bending line PBL1 in the second direction DR2. In addition, the width of each of the first data connection lines DCL1, the second data connection lines DCL2, and the power connection lines PCL in the second direction DR2 may be less than each of a width of the second-first power bending line PBL2*a* in the second direction DR2 and a width of the second-second power bending line PBL2*b* in the second direction DR2.

In FIG. 7, each of the first data connection lines DCL1, the second data connection lines DCL2, and the power connection lines PCL may have a same width in the second direction DR2, but embodiments are not limited thereto. The width of each of the first data connection lines DCL1, the second data connection lines DCL2, and the power connection lines PCL in the second direction DR2 may be variously changed.

The data transfer lines DTL may overlap the third bending area BA3 and may not overlap the first bending area BA1 and the second bending area BA2. Likewise, the power connection lines PCL may overlap the third bending area BA3 and may not overlap the first bending area BA1 and the second bending area BA2. In the third bending area BA3, the data bending lines DBL and the second power connection lines PCL2 may be arranged to be spaced apart from each other in the second direction DR2.

In an embodiment, an interval between two of the data lines DL adjacent to each other may be greater than an interval between two of the data bending lines DBL adjacent to each other. Accordingly, at least some of the data fan-out lines DFL may extend in a diagonal direction between the first direction DR1 and the second direction DR2.

Figure 10:
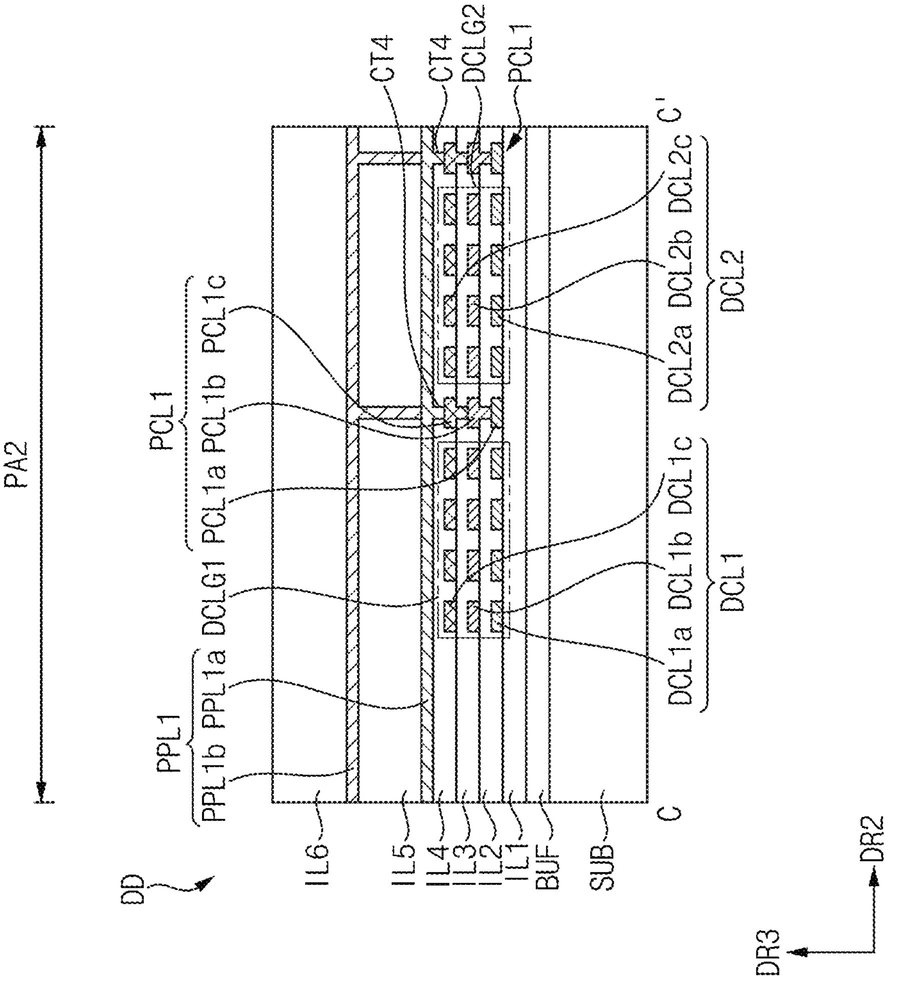
FIG. 10 is a cross-sectional view illustrating an example taken along line C-C' of FIG. 7.
Figure 12:
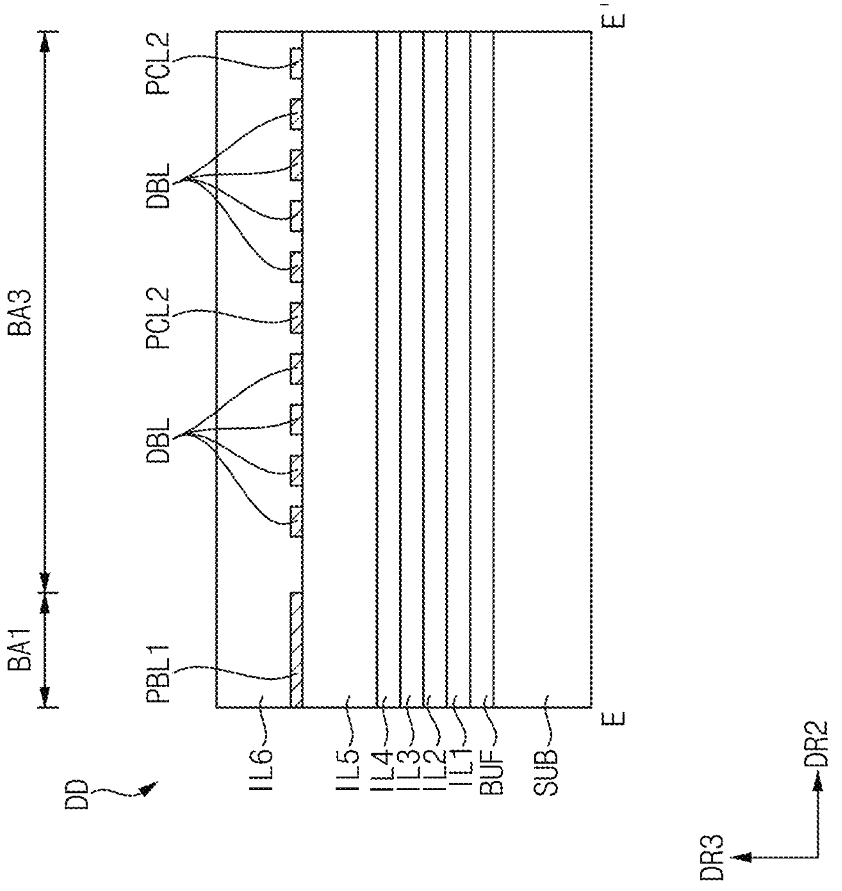
FIG. 12 is a cross-sectional view illustrating an example taken along line E-E' of FIG. 7.
Figure 13:
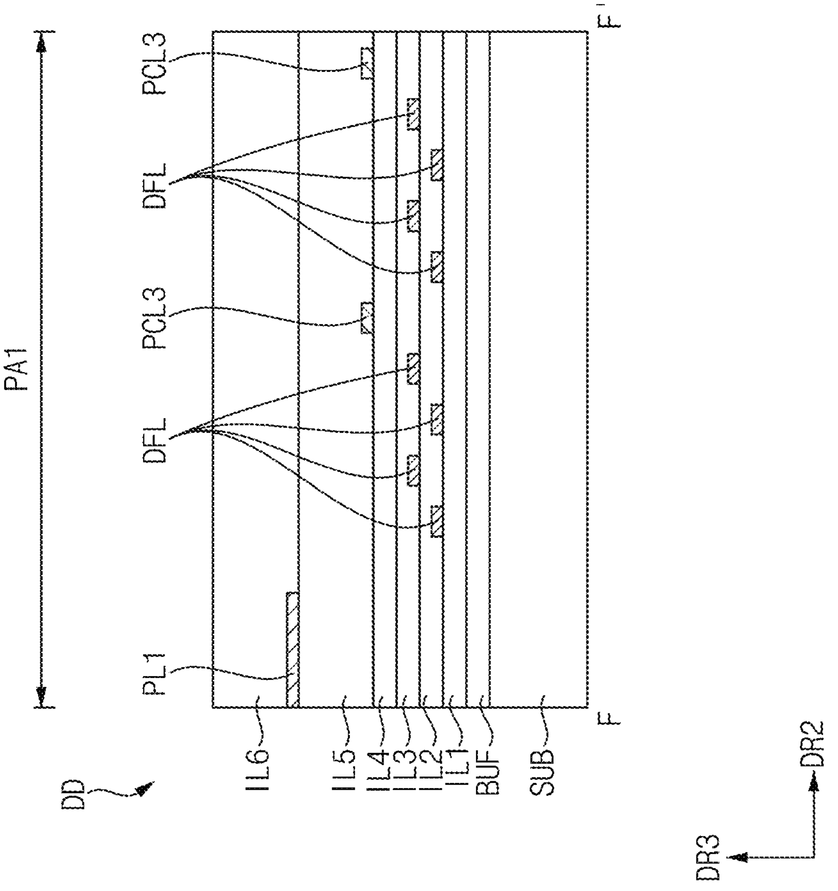
FIG. 13 is a cross-sectional view illustrating an example taken along line F-F' of FIG. 7.

FIG. 8 is a cross-sectional view illustrating an example taken along line A-A' of FIG. 7. FIG. 9 is a cross-sectional view illustrating an example taken along line B-B' of FIG. 7. FIG. 10 is a cross-sectional view illustrating an example taken along line C-C' of FIG. 7. FIG. 11 is a cross-sectional view illustrating an example taken along line D-D' of FIG. 7. FIG. 12 is a cross-sectional view illustrating an example taken along line E-E' of FIG. 7. FIG. 13 is a cross-sectional view illustrating an example taken along line F-F' of FIG. 7.

Hereinafter, stacked structures of the plurality of lines in an area adjacent to the bending area BA of the display device DD according to embodiments will be described with reference to FIGS. 7 to 13.

The first data connection line DCL1 may be disposed on a different layer from the data bending line DBL. In an embodiment, as illustrated in FIG. 8, the first data connection line DCL1 may include a plurality of layers disposed in the third direction DR3. For example, the first data connection line DCL1 may include a first layer DCL1*a*, a second layer DCL1*b*, and a third layer DCL1*c*.

For example, the first layer DCL1*a* may be included in the first conductive layer disposed between the first insulating layer IL1 and the second insulating layer IL2. That is, the first layer DCL1*a* may be disposed on the same layer as the gate electrode GE of FIG. 4. For example, the second layer DCL1*b* may be included in the second conductive layer disposed between the second insulating layer IL2 and the third insulating layer IL3. That is, the second layer DCL1*b* may be disposed on the same layer as the capacitor electrode CPE of FIG. 4. For example, the third layer DCL1*c* may be included in the third conductive layer disposed between the third insulating layer IL3 and the fourth insulating layer IL4.

The first to third layers DCL1*a*, DCL1*b*, and DCL1*c* may be electrically connected to each other through contact holes CTa and CTb. Because the first data connection line DCL1 includes first to third layers DCL1*a*, DCL1*b*, and DCL1*c* electrically connected to each other, a resistance of the first data connection line DCL1 may be relatively reduced. However, this is an example and embodiments are not limited thereto, and the first data connection line DCL1 may include only one conductive layer, or may include two or four or more conductive layers electrically connected to each other.

The first data connection line DCL1 may be electrically connected to the corresponding data bending line DBL through a first contact hole CT1.

In an embodiment, the data bending line DBL may include only one conductive layer. For example, the data bending line DBL may be included in the fifth conductive layer disposed between the fifth insulating layer IL5 and the sixth insulating layer IL6. That is, the data bending line DBL may be disposed on the same layer as the connection electrode CNE of FIG. 4. For example, the first contact hole CT1 may penetrate the fourth insulating layer IL4 and the fifth insulating layer IL5 in the third direction DR3.

The first data connection line DCL1 may overlap the groove area GA. The first data connection line DCL1 may be electrically connected to the corresponding data bending line DBL through the first contact hole CT1 between the groove area GA and the bending area BA. That is, the first contact hole CT1 may be positioned between the groove area GA and the bending area BA (e.g., between the groove area GA and the third bending area BA3) in a plan view.

In an embodiment, the second data connection line DCL2 may include a first layer DCL2*a*, a second layer DCL2*b*, and a third layer DCL2*c* as illustrated in FIG. 10 and may have substantially the same stacked structure as the first data connection line DCL1. The second data connection line DCL2 may be electrically connected to the corresponding data bending line DBL through a contact hole between the groove area GA and the bending area BA.

As illustrated in FIGS. 8 and 11, in the groove area GA, an uppermost layer of the first data connection line DCL1 (e.g., the third layer DCL1*c*) and an uppermost layer of the second data connection line DCL2 (e.g., the third layer DCL2*c*) may be covered by the inorganic insulating layer (e.g., the fourth insulating layer IL4). That is, even if the organic insulating layers (e.g., the fifth and sixth insulating layers IL5 and IL6) are removed to prevent moisture penetration in the groove area GA, the first data connection lines DCL1 and the second data connection lines DCL2 may not be exposed to an outside. Accordingly, the first data connection lines DCL1 and the second data connection lines DCL2 may be prevented from being corroded, and the reliability of the display device DD may be improved.

The data bending line DBL may be electrically connected to the corresponding data fan-out line DFL through a second contact hole CT2 in the first peripheral area PA1. The data fan-out line DFL may be disposed on a different layer from the data bending line DBL.

In an embodiment, as illustrated in FIG. 13, two of the data fan-out lines DFL adjacent to each other may be disposed on different layers from each other. For example, one of the two adjacent data fan-out lines DFL may be included in the first conductive layer disposed between the first insulating layer IL1 and the second insulating layer IL2, and the other may be included in the second conductive layer disposed between the second insulating layer IL2 and the third insulating layer IL3. However, this is an example and embodiments are not limited thereto. For example, some of the data fan-out lines DFL may be included in the third conductive layer disposed between the third insulating layer IL3 and the fourth insulating layer IL4. For another example, all of the data fan-out lines DFL may be disposed on the same layer.

The data fan-out line DFL may be electrically connected to the corresponding data line DL through a third contact hole CT3 in the first peripheral area PA1. The data line DL may be disposed on a different layer from the data fan-out line DFL.

In an embodiment, the first power pad line PPL1 may be disposed on a different layer from the data connection lines DCL and the first power connection lines PCL1.

In an embodiment, as illustrated in FIGS. 8 and 9, the first power pad line PPL1 may include a plurality of layers disposed in the third direction DR3. For example, the first power pad line PPL1 may include a first layer PPL1*a* and a second layer PPL1*b*.

For example, the first layer PPL1*a* may be included in the fourth conductive layer disposed between the fourth insulating layer IL4 and the fifth insulating layer IL5. That is, the first layer PPL1*a* may be disposed on the same layer as the first electrode E1 and the second electrode E2 of FIG. 4. For example, the second layer PPL1*b* may be included in the fifth conductive layer disposed between the fifth insulating layer IL5 and the sixth insulating layer IL6. That is, the second layer PPL1*b* may be disposed on the same layer as the connection electrode CNE of FIG. 4.

The first layer PPL1*a* and the second layer PPL1*b* may be electrically connected to each other through a contact hole CTc. Because the first power pad line PPL1 includes first and second layers PPL1*a* and PPL1*b* electrically connected to each other, a resistance of the first power pad line PPL1 may be relatively reduced. However, this is an example and embodiments are not limited thereto, and the first power pad line PPL1 may include only one conductive layer. In addition, each of the second-first power pad line PPL2*a* and the second-second power pad line PPL2*b* may have substantially the same stacked structure as the first power pad line PPL1.

The first power pad line PPL1 may be connected to the first power bending lines PBL1. In an embodiment, each of the first power bending lines PBL1 may include only one conductive layer. For example, the first power bending lines PBL1 may be physically integrated with the second layer PPL1*b* of the first power pad line PPL1, but embodiments are not limited thereto.

As illustrated in FIGS. 9 and 10, the first power pad line PPL1 may be electrically connected to the first power connection line PCL1 through a fourth contact hole CT4 in the second peripheral area PA2. The first power pad line PPL1 may not overlap the groove area GA. The fourth contact hole CT4 may be spaced apart from the groove area GA in the first direction DR1.

In an embodiment, the first power connection line PCL1 may have substantially the same stacked structure as the first data connection line DCL1. For example, as illustrated in FIG. 9, the first power connection line PCL1 may include a plurality of layers disposed in the third direction DR3. For example, the first power connection line PCL1 may include a first layer PCL1*a*, a second layer PCL1*b*, and a third layer PCL1*c*.

For example, the first layer PCL1*a* may be included in the first conductive layer disposed between the first insulating layer IL1 and the second insulating layer IL2. That is, the first layer PCL1*a* may be disposed on the same layer as the gate electrode GE of FIG. 4. For example, the second layer PCL1*b* may be included in the second conductive layer disposed between the second insulating layer IL2 and the third insulating layer IL3. That is, the second layer PCL1*b* may be disposed on the same layer as the capacitor electrode CPE of FIG. 4. For example, the third layer PCL1*c* may be included in the third conductive layer disposed between the third insulating layer IL3 and the fourth insulating layer IL4.

The first to third layers PCL1*a*, PCL1*b*, and PCL1*c* may be electrically connected to each other through contact holes CTd and CTe. Because the first power connection line PCL1 includes first to third layers PCL1*a*, PCL1*b*, and PCL1*c* electrically connected to each other, a resistance of the first power connection line PCL1 may be relatively reduced. However, this is an example and embodiments are not limited thereto, and the first power connection line PCL1 may include only one conductive layer, or may include two or four or more conductive layers electrically connected to each other.

The first power connection line PCL1 may be electrically connected to the corresponding second power connection line PCL2 through a fifth contact hole CT5. The fifth contact hole CT5 may be spaced apart from the fourth contact hole CT4 with the groove area GA interposed therebetween.

In an embodiment, the second power connection line PCL2 may include only one conductive layer. For example, the second power connection line PCL2 may be included in the fifth conductive layer disposed between the fifth insulating layer IL5 and the sixth insulating layer IL6. For example, the fifth contact hole CT5 may penetrate the fourth insulating layer IL4 and the fifth insulating layer IL5 in the third direction DR3.

The first power connection line PCL1 may overlap the groove area GA. The first power connection line PCL1 may be electrically connected to the corresponding second power connection line PCL2 through the fifth contact hole CT5 between the groove area GA and the bending area BA. That is, the fifth contact hole CT5 may be positioned between the groove area GA and the bending area BA (e.g., between the groove area GA and the third bending area BA3) in a plan view.

As illustrated in FIGS. 9 and 11, in the groove area GA, an uppermost layer of the first power connection line PCL1 (e.g., the third layer PCL1*c*) may be covered by the inorganic insulating layer (e.g., the fourth insulating layer IL4). That is, even if the organic insulating layers (e.g., the fifth and sixth insulating layers IL5 and IL6) are removed to prevent moisture penetration in the groove area GA, the first power connection lines PCL1 may not be exposed to the outside. Accordingly, the first power connection lines PCL1 may be prevented from being corroded, and the reliability of the display device DD may be improved.

As illustrated in FIG. 12, in the bending area BA, the first power bending line PBL1, the data bending line DBL, and the second power connection line PCL2 arranged along the second direction DR2 may be disposed on the same layer (e.g., the fifth conductive layer) as each other. In addition, the second-first power bending line PBL2*a* and the second-second power bending line PBL2*b* may be disposed on the same layer as the first power bending line PBL1, the data bending line DBL, and the second power connection line PCL2.

In an embodiment, as illustrated in FIG. 9, the second power connection line PCL2 may be electrically connected to the corresponding third power connection line PCL3 through a sixth contact hole CT6 in the first peripheral area PA1. The third power connection line PCL3 may be disposed on a different layer from the second power connection line PCL2. For example, the third power connection line PCL3 may be included in the fourth conductive layer disposed between the fourth insulating layer IL4 and the fifth insulating layer IL5. The third power connection line PCL3 may be electrically connected to the first power line PL1 through a seventh contact hole CT7 in the first peripheral area PA1.

In an embodiment, the second power connection line PCL2 may be physically integrated with the first power line PL1. In this case, the third power connection line PCL3 may be omitted.

In the above description, the stacked structures of the plurality of lines in the area adjacent to the bending area BA has been described with reference to FIGS. 7 to 13. However, this is an example and embodiments are not limited thereto, and the stacked structures of the plurality of lines may be variously changed.

According to embodiments, the display device DD may include the first data connection lines DCL1 and the second data connection lines DCL2 connected to the data distributor DDT. The first data connection lines DCL1 may receive the data signal DATA in response to the first distribution selection signal CL1, and the second data connection lines DCL2 may receive the data signal DATA in response to the second distribution selection signal CL2. Accordingly, the data signal DATA may be selectively provided to the two data connection lines. For example, when the first distribution selection signal CL1 and the second distribution selection signal CL2 have different timings, data time division driving may be implemented.

The display device DD may include the first data connection line groups DCLG1 each including the first data connection lines DCL1 adjacent to each other. In addition, the display device DD may include the second data connection line groups DCLG2 each including the second data connection lines DCL2 adjacent to each other. Also, the display device DD may include power connection lines PCL to which a power supply voltage is applied and positioned between the first data connection line groups DCLG1 and the second data connection line groups DCLG2 in a plan view. As the power connection lines PCL are positioned between the first data connection line groups DCLG1 and the second data connection line groups DCLG2 in a plan view, the power connection lines PCL may function as shielding lines for preventing coupling between the data connection lines DCL. Thus, the reliability of the display device DD may be improved.

In addition, the second peripheral area PA2 of the display device DD may include the groove areas GA where the organic insulating layers are removed to prevent moisture penetration. Each of the power connection lines PCL may include the first power connection line PCL1 disposed in the second peripheral area PA2 and overlapping the groove area GA, the second power connection line PCL2 disposed in the bending area BA, and the third power connection line PCL3 disposed in the first peripheral area PA1. In the groove area GA, the uppermost layer of the first power connection line PCL1 may be covered by the inorganic insulating layer. That is, even if the organic insulating layers are removed to prevent moisture penetration in the groove area GA, the first power connection lines PCL1 may not be exposed to the outside. Accordingly, the power connection lines PCL that function as shielding lines may be prevented from being corroded, and the reliability of the display device DD may be improve.

Figure 14:
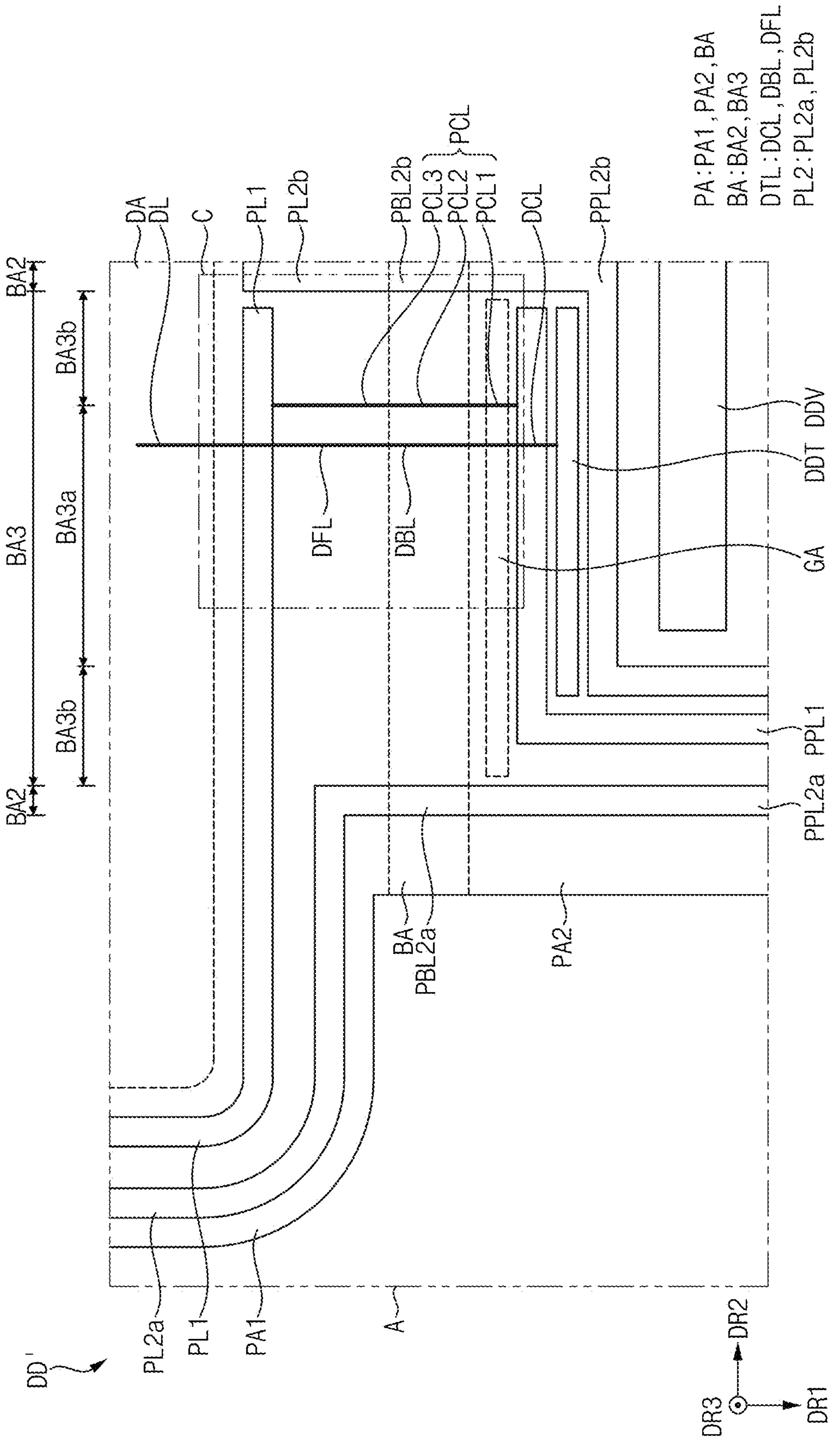
FIG. 14 is an enlarged view illustrating another example of an area A of FIG. 1.
Figure 15:
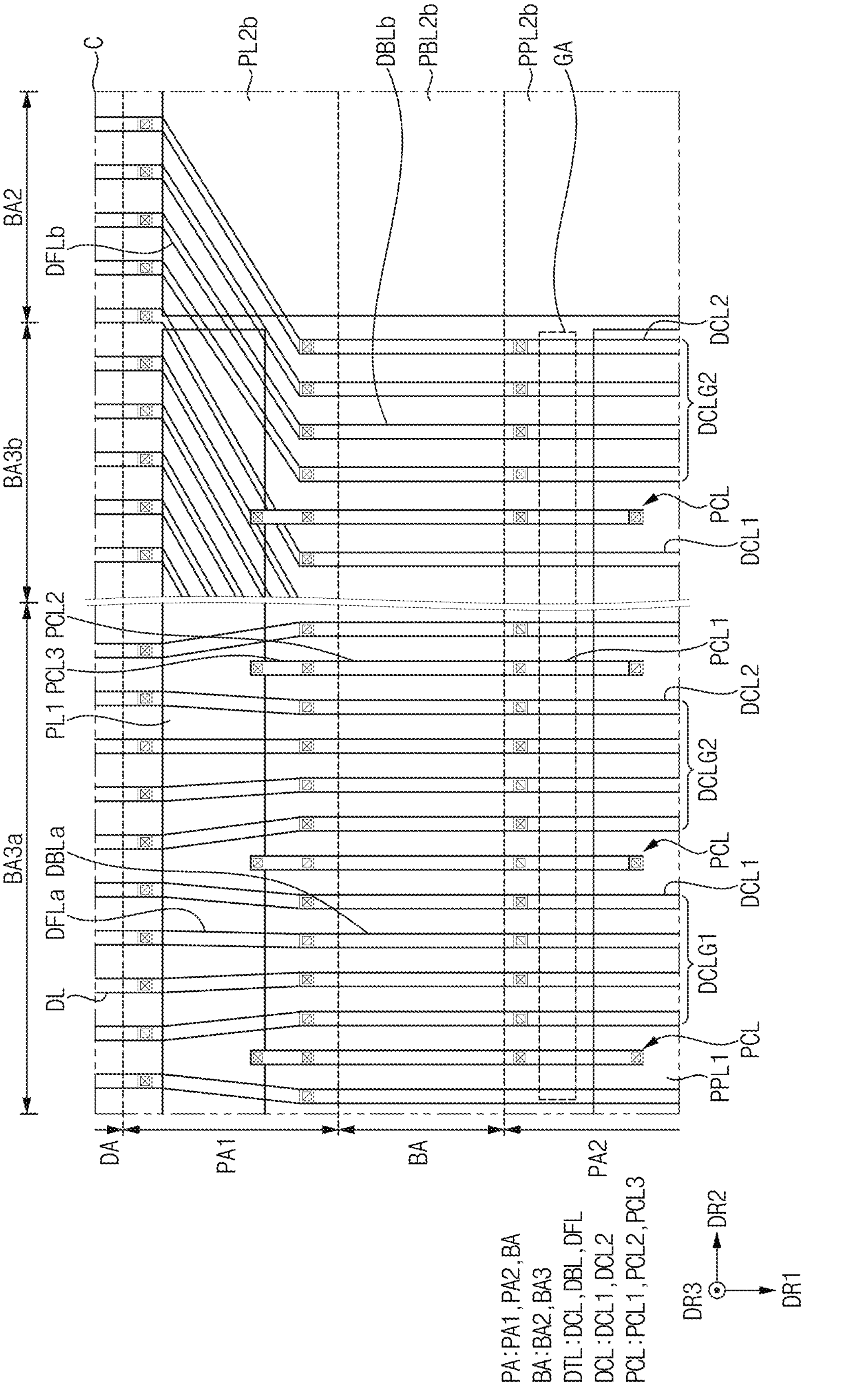
FIG. 15 is an enlarged view illustrating an example of an area C of FIG. 14.

FIG. 14 is an enlarged view illustrating another example of an area A of FIG. 1. FIG. 15 is an enlarged view illustrating an example of an area C of FIG. 14.

A display device DD' illustrated in FIGS. 14 and 15 may be substantially the same as or similar to the display device DD described with reference to FIGS. 6 to 13 except that the first power bending lines PBL1 are omitted. Therefore, hereinafter, the display device DD' of FIGS. 14 and 15 will be described focusing on differences from the display device DD described with reference to FIGS. 6 to 13, and repeated descriptions may be omitted or simplified.

Referring to FIGS. 1, 14, and 15, in an embodiment, the first power bending lines PBL1 of FIGS. 6 and 7 may be omitted. The first power line PL1 may be electrically connected to the first power pad line PPL1 through the power connection lines PCL. The first power line PL1 may receive the first power supply voltage ELVDD from the first power pad line PPL1 through the power connection lines PCL.

A voltage difference between the data voltage and the first power supply voltage ELVDD may be relatively small. For example, the voltage difference between the data voltage and the first power supply voltage ELVDD may be in a range of about 2 V to about 4 V. Accordingly, even if the power connection lines PCL having a relatively narrow width (e.g., width in the second direction DR2) are positioned between the first data connection line groups DCLG1 and the second data connection line groups DCLG2 and receive the first power supply voltage ELVDD, a risk of corrosion of the power connection lines PCL may be relatively small. Thus, even if the first power bending lines PBL1 having a relatively wide width (e.g., width in the second direction DR2) are omitted, the first power supply voltage ELVDD may be sufficiently transferred to the first power line PL1 through the power connection lines PCL.

In an embodiment, the second-first power bending line PBL2*a* and the second-second power bending line PBL2*b* may not be omitted. A voltage difference between the data voltage and the second power supply voltage ELVSS may be relatively large. For example, the voltage difference between the data voltage and the second power supply voltage ELVSS may be in a range of about 9 V to about 12 V. Accordingly, if connection lines having a relatively narrow width are positioned between the first data connection line groups DCLG1 and the second data connection line groups DCLG2 and receive the second power supply voltage ELVSS, a risk of corrosion of the connection lines may be relatively large. Thus, the second-first power line PL2*a* and the second-second power line PL2*b* may receive the second power supply voltage ELVSS from the second-first power pad line PPL2*a* and the second-second power pad line PPL2*b* through the second-first power bending line PBL2*a* and the second-second power bending line PBL2*b* having a relatively wide width.

In an embodiment, the bending area BA may include the second bending areas BA2 and the third bending area BA3, and may not include the first bending area BA1 of FIGS. 6 and 7. The second bending areas BA2 may be defined as areas where the second-first power bending line PBL2*a* and the second-second power bending line PBL2*b* are disposed. The third bending area BA3 may be defined as an area between the second-first power bending line PBL2*a* and the second-second power bending line PBL2*b*. That is, the third bending area BA3 may be defined as an area between the second bending areas BA2.

Because the first power bending lines PBL1 having a relatively wide width are omitted, the data bending lines DBL and the second power connection lines PCL2 may also be disposed in an area where the first power bending lines PBL1 were disposed. That is, compared to the embodiment of FIGS. 6 and 7 including the first power bending lines PBL1, the third bending area BA3 where the data bending lines DBL and the second power connection lines PCL2 are disposed may be expanded. Accordingly, compared to the embodiment of FIGS. 6 and 7, the data bending lines DBL and the second power connection lines PCL2 disposed in the bending area BA may be spaced apart from each other with a relatively wide interval. Thus, compared to the embodiment of FIGS. 6 and 7, a difference between an interval between the adjacent data lines DL2 in the display area DA and an interval between the adjacent data bending lines DBL in the bending area BA may be reduced. Accordingly, in at least a portion of the first peripheral area PA1, the data fan-out lines DFL connecting the data lines DL and the data bending lines DBL may be relatively straight. Thus, a resistance deviation between the data fan-out lines DFL may be minimized.

Because the first power bending lines PBL1 are omitted and the second-first power bending line PBL2*a* and the second-second power bending line PBL2*b* are not omitted, at least some of the data fan-out lines DFL in the first peripheral area PA1 may have different lengths or slopes.

In an embodiment, the third bending area BA3 may include a third-first bending area BA3*a* and third-second bending areas BA3*b*. The third-second bending areas BA3*b* may be defined as areas each adjacent to the second-first power bending line PBL2*a* and the second-second power bending line PBL2*b*. That is, the third-second bending areas BA3*b* may be both side areas of the third bending area BA3 in the second direction DR2 and in a direction opposite to the second direction DR2. The third-first bending area BA3*a* may be defined as an area between the third-second bending areas BA3*b*. That is, the third-first bending area BA3*a* may be a central area of the third bending area BA3 in the second direction DR2. For example, the third-first bending area BA3*a* may be spaced apart from the second bending area BA2 with the third-second bending area BA3*b* interposed therebetween.

Some of the data bending lines DBL disposed in the third-first bending area BA3*a* may be referred to as first data bending lines DBLa, and the others disposed in the third-second bending area BA3*b* may be referred to as second data bending lines DBLb. In addition, some of the data fan-out lines DFL connected to the first data bending lines DBLa may be referred to as first data fan-out lines DFLa, and the others connected to the second data bending lines DBLb may be referred to as second data fan-out lines DFLb.

For example, the second data fan-out lines DFLb may be adjacent to the second-first power line PL2*a* or the second-second power line PL2*b*. The first data fan-out lines DFLa may be relatively far from the second-first power line PL2*a* and the second-second power line PL2*b*. For example, the first data fan-out lines DFLa may be spaced apart from the second-first power line PL2*a* or the second-second power line PL2*b* with the second data fan-out lines DFLb interposed therebetween.

In an embodiment, as illustrated in FIG. 15, the first data fan-out line DFLa may be relatively straight compared to the second data fan-out line DFLb. For example, a first length of the first data fan-out line DFLa may be less than a second length of the second data fan-out line DFLb. The first length may be a length in a direction in which the first data fan-out line DFLa extends, and the second length may be a length in a direction in which the second data fan-out line DFLb extends.

For example, a first angle between an imaginary line extending in the first direction DR1 and the first data fan-out line DFLa may be less than a second angle between the imaginary line and the second data fan-out line DFLb. Each of the first angle and the second angle may be acute angle.

Figure 16:
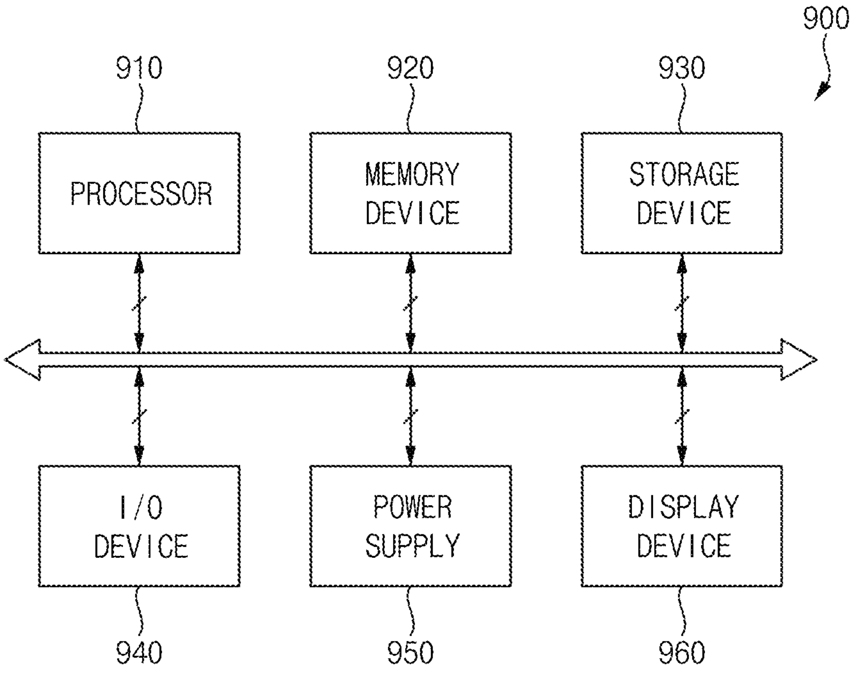
FIG. 16 is a block diagram illustrating an electronic device according to an embodiment.

FIG. 16 is a block diagram illustrating an electronic device according to an embodiment.

Referring to FIG. 16, in an embodiment, an electronic device 900 may include a processor 910, a memory device 920, a storage device 930, an input/output ("I/O") device 940, a power supply 950, and a display device 960. Here, the display device 960 may correspond to the display device DD of FIG. 6 or the display device DD' of FIG. 14. The electronic device 900 may further include a plurality of ports for communicating with a video card, a sound card, a memory card, a universal serial bus ("USB") device, or the like. In an embodiment, the electronic device 900 may be implemented as a television. In another embodiment, the electronic device 900 may be implemented as a smart phone. However, embodiments are not limited thereto, in another embodiment, the electronic device 900 may be implemented as a cellular phone, a video phone, a smart pad, a smart watch, a tablet personal computer ("PC"), a car navigation system, a computer monitor, a laptop, a head disposed (e.g., mounted) display ("HMD"), or the like.

The processor 910 may perform various computing functions. In an embodiment, the processor 910 may be a microprocessor, a central processing unit ("CPU"), an application processor ("AP"), or the like. The processor 910 may be coupled to other components via an address bus, a control bus, a data bus, or the like. In an embodiment, the processor 910 may be coupled to an extended bus such as a peripheral component interconnection ("PCI") bus.

The memory device 920 may store data for operations of the electronic device 900. In an embodiment, the memory device 920 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, or the like, and/or at least one volatile memory device such as a dynamic random access memory ("DRAM") device, a static random access memory ("SRAM") device, a mobile DRAM device, or the like.

In an embodiment, the storage device 930 may include a solid state drive ("SSD") device, a hard disk drive ("HDD") device, a CD-ROM device, or the like. In an embodiment, the I/O device 940 may include an input device such as a keyboard, a keypad, a mouse device, a touchpad, a touch-screen, or the like, and an output device such as a printer, a speaker, or the like.

The power supply 950 may provide power for operations of the electronic device 900. The power supply 950 may provide power to the display device 960. The display device 960 may be coupled to other components via the buses or other communication links. In an embodiment, the display device 960 may be included in the I/O device 940.

Although embodiments and implementations have been described herein, other embodiments and modifications will be apparent from this description. Accordingly, the inventive concept is not limited to such embodiments, but rather to the broader scope of the appended claims and various obvious modifications and equivalent arrangements as would be apparent to a person of ordinary skill in the art.

What is claimed is:

1. A display device comprising:

a substrate including a display area, a first peripheral area surrounding the display area, a second peripheral area positioned in a first direction from the first peripheral area, and a bending area positioned between the first peripheral area and the second peripheral area;

a data distributor in the second peripheral area on the substrate and spaced apart from the display area with the bending area interposed therebetween;

a data driver in the second peripheral area on the substrate and positioned in the first direction from the data distributor;

first data connection line groups including first data connection lines electrically connected to the data distributor and configured to receive a data signal output from the data driver in response to a first distribution selection signal;

second data connection line groups including second data connection lines electrically connected to the data distributor and configured to receive the data signal output from the data driver in response to a second distribution selection signal;

power connection lines configured to receive a first power supply voltage, wherein each of the power connection lines is between one of the first data connection line groups and one of the second data connection line groups adjacent to each other;

a first power pad line in the second peripheral area on the substrate and configured to receive the first power supply voltage from a first power pad;

a first power line in the first peripheral area on the substrate, wherein the power connection lines are electrically connected to the first power pad line and the first power line;

a first power connection line in the second peripheral area on the substrate and electrically connected to the first power pad line; and a second power connection line in the bending area on the substrate and electrically connected to the first power connection line, wherein the second peripheral area includes a groove area spaced apart from the bending area in the first direction, and wherein the first power connection line overlaps the groove area and is electrically connected to the second power connection line through a second contact hole between the bending area and the groove area.

2. The display device of claim 1, wherein the first power connection line is disposed on a different layer from the first power pad line and the second power connection line, is electrically connected to the first power pad line through a first contact hole, and is electrically connected to the second power connection line through the second contact hole, wherein the first contact hole is positioned in the first direction from the groove area.

3. The display device of claim 1, further comprising:

an inorganic insulating layer covering the first power connection line; and an organic insulating layer on the inorganic insulating layer, covering the first power pad line, and defining an opening overlapping the groove area.

4. The display device of claim 1, further comprising:

data bending lines in the bending area on the substrate and electrically connected to the first data connection lines and the second data connection lines.

5. The display device of claim 4, wherein each of the first data connection lines and the second data connection lines overlaps the groove area and is electrically connected to a corresponding one of the data bending lines through a contact hole between the bending area and the groove area.

6. The display device of claim 4, wherein the second power connection line and the data bending lines are disposed on a same layer.

7. The display device of claim 6, wherein the second power connection line and the data bending line are spaced apart from each other in a second direction crossing the first direction in a plan view.

8. The display device of claim 4, further comprising:

a second power pad line in the second peripheral area on the substrate, spaced apart from the first power pad line, and configured to receive a second power supply voltage from a second power pad;

a second power line in the first peripheral area on the substrate, spaced apart from the first power line, and configured to receive the second power supply voltage; and a second power bending line in the bending area on the substrate, spaced apart from the second power connection line and the data bending lines, and electrically connected to the second power pad line and the second power line.

9. The display device of claim 8, further comprising:

data lines connected to pixels in the display area and each extending in the first direction; and data fan-out lines in the first peripheral area on the substrate and connecting the data lines and the data bending lines, respectively, wherein the data fan-out lines include a first data fan-out line adjacent to the second power line and a second data fan-out line spaced apart from the second power line with the first data fan-out line interposed therebetween, and wherein a length of the first data fan-out line is greater than a length of the second data fan-out line.

10. The display device of claim 9, wherein an imaginary line extending in the first direction is defined, and wherein an angle between the imaginary line and the first data fan-out line is greater than an angle between the imaginary line and the second data fan-out line.

11. The display device of claim 1, wherein the first power connection line, the first data connection lines, and the second data connection lines are disposed on a same layer.

12. The display device of claim 1, wherein each of the power connection lines further includes:

a third power connection line in the first peripheral area on the substrate and electrically connected to the second power connection line and the first power line.

13. The display device of claim 1, further comprising:

a first power bending line in the bending area on the substrate and connecting the first power pad line and the first power line, and wherein a width of the first power bending line is greater than a width of the second power connection line.

14. The display device of claim 13, wherein the second power connection line and the first power bending line are disposed on a same layer.

15. The display device of claim 1, wherein the first data connection lines and the second data connection lines overlap the first power pad line in a plan view.

16. The display device of claim 1, wherein the first data connection lines, the second data connection lines, and the power connection lines are spaced apart from each other in a second direction crossing the first direction.

17. The display device of claim 1, wherein the data distributor includes:

first distribution transistors each including a first electrode to which the data signal is applied, a second electrode connected to the first data connection line, and a gate electrode configured to receive the first distribution selection signal; and second distribution transistors each including a first electrode to which the data signal is applied, a second electrode connected to the second data connection lines, and a gate electrode configured to receive the second distribution selection signal.

18. An electronic device comprising:

a display device; and a power supply configured to provide power to the display device, wherein the display device comprises:

a substrate including a display area, a first peripheral area surrounding the display area, a second peripheral area positioned in a first direction from the first peripheral area, and a bending area positioned between the first peripheral area and the second peripheral area;

a data distributor in the second peripheral area on the substrate and spaced apart from the display area with the bending area interposed therebetween;

a data driver in the second peripheral area on the substrate and positioned in the first direction from the data distributor;

first data connection line groups including first data connection lines electrically connected to the data distributor and configured to receive a data signal output from the data driver in response to a first distribution selection signal;

second data connection line groups including second data connection lines electrically connected to the data distributor and configured to receive the data signal output from the data driver in response to a second distribution selection signal;

power connection lines configured to receive a first power supply voltage, wherein each of the power connection lines is between one of the first data connection line groups and one of the second data connection line groups adjacent to each other;

a first power pad line in the second peripheral area on the substrate and configured to receive the first power supply voltage from a first power pad;

a first power line in the first peripheral area on the substrate, wherein the power connection lines are electrically connected to the first power pad line and the first power line;

a first power connection line in the second peripheral area on the substrate and electrically connected to the first power pad line; and a second power connection line in the bending area on the substrate and electrically connected to the first power connection line, wherein the second peripheral area includes a groove area spaced apart from the bending area in the first direction, and wherein the first power connection line overlaps the groove area and is electrically connected to the second power connection line through a second contact hole between the bending area and the groove area.

* * * * *